US009894335B2

United States Patent
Ohara

(10) Patent No.: US 9,894,335 B2
(45) Date of Patent: Feb. 13, 2018

(54) IMAGE DISPLAY DEVICE AND CONTROL METHOD THEREOF

(71) Applicant: JVC KENWOOD Corporation, Yokohama-shi, Kanagawa (JP)

(72) Inventor: Tatsuya Ohara, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/591,408

(22) Filed: May 10, 2017

(65) Prior Publication Data

US 2017/0244944 A1   Aug. 24, 2017

Related U.S. Application Data

(63) Continuation of application No. PCT/JP2015/004649, filed on Sep. 11, 2015.

(30) Foreign Application Priority Data

Nov. 10, 2014   (JP) .................................. 2014-227673

(51) Int. Cl.
| | | |
|---|---|---|
| H04N 3/22 | (2006.01) | |
| H04N 9/31 | (2006.01) | |
| G02B 27/01 | (2006.01) | |
| G02B 26/10 | (2006.01) | |

(52) U.S. Cl.
CPC ......... *H04N 9/3185* (2013.01); *G02B 26/101* (2013.01); *G02B 27/0101* (2013.01); *H04N 9/3135* (2013.01)

(58) Field of Classification Search
CPC .. H04N 9/3185; H04N 9/3135; G02B 26/101; G02B 27/0101

USPC .......................................................... 348/745
See application file for complete search history.

(56) References Cited

U.S. PATENT DOCUMENTS

| | | | | |
|---|---|---|---|---|
| 2011/0102870 A1* | 5/2011 | Nakamura | ........... | G02B 26/085 359/198.1 |
| 2014/0111839 A1* | 4/2014 | Suzuki | .................. | B06B 1/0238 359/198.1 |
| 2014/0321159 A1* | 10/2014 | Lin | ....................... | G02B 6/0031 362/609 |
| 2014/0333902 A1* | 11/2014 | Aboshi | .................. | G02B 27/48 353/38 |
| 2016/0286185 A1* | 9/2016 | Oohara | .............. | G02B 26/0858 |

FOREIGN PATENT DOCUMENTS

| | | |
|---|---|---|
| EP | 1275998 A1 | 1/2003 |
| JP | 2007-025522 | 2/2007 |

* cited by examiner

*Primary Examiner* — Michael Lee
(74) *Attorney, Agent, or Firm* — Procopio, Cory, Hargreaves & Savitch LLP

(57) ABSTRACT

An image display device includes: an RGB laser diode configured to output laser light; a horizontal scanner configured to reflect the laser light and perform a reciprocating operation in a horizontal direction; a scanning detection unit configured to detect a forward or reverse operation range and a reciprocating operation range in each line in the horizontal direction; a drawing position control unit configured to determine an image display position in each line based on a difference between the detected operation ranges and a reference value; and a laser driver configured to drive the RGB laser diode based on image data at a timing corresponding to the determined image display position.

8 Claims, 37 Drawing Sheets

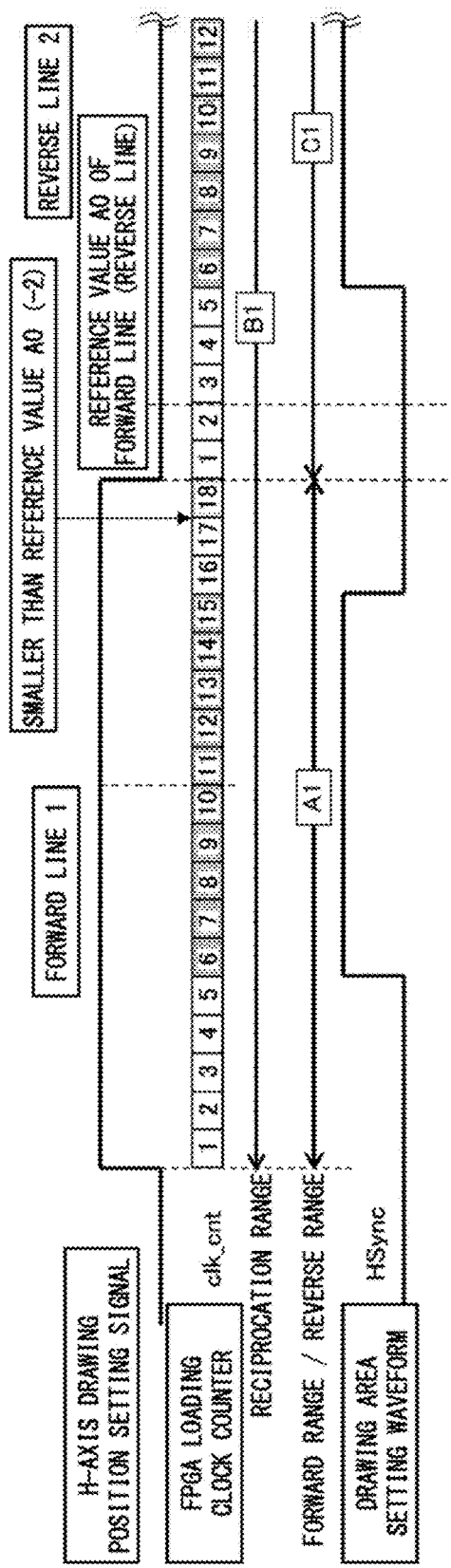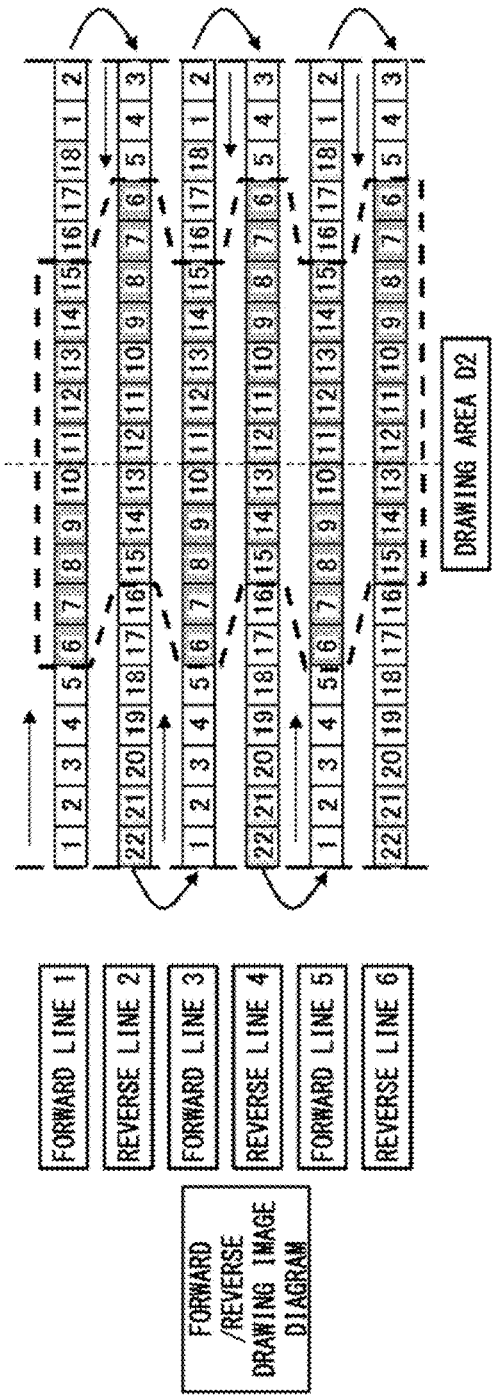
Fig. 9A

IMAGE DISPLAY DEVICE AND CONTROL METHOD THEREOF

CROSS REFERENCE TO RELATED APPLICATION

This application is a continuation of PCT application No. PCT/JP2015/004649 filed Sep. 11, 2015 and claims the benefit of priority from Japanese patent application No. 2014-227673, filed on Nov. 10, 2014, the disclosure of which is incorporated herein in its entirety by reference.

BACKGROUND

The present invention relates to an image display device and a control method thereof, and more specifically, to an image display device for a laser scan system and a control method thereof.

An image display device of a laser scan system that projects and displays an image by scanning reflected laser light is known (for example, Japanese Unexamined Patent Application Publication No. 2007-025522). The image display device of the laser scan system is used as, for example, a HUD (Head Up Display), which projects and displays an image on a windshield or a combiner of a vehicle, and a projector.

In the image display device of the laser scan system, an optical scanner including a mirror reflects laser light, and the mirror of the optical scanner is oscillated in a reciprocating manner in the horizontal direction and the vertical direction, thereby scanning the laser light.

SUMMARY

In the image display device of the related art, a feedback control is performed to control the laser light scanning operation of the optical scanner. For example, in Japanese Unexamined Patent Application Publication No. 2007-025522, an optical sensor detects light reflected by the optical scanner, and the feedback of the detection result is performed. In another related art, an operation of an optical scanner provided with a piezoelectric film is detected by the piezoelectric film, and the feedback of the detection result is performed. In the feedback control in the image display devices of the related art, for example, the start timing of a drive signal to drive the optical scanner is controlled to keep the scanning frequency constant.

However, the reciprocating operation of the optical scanner may be varied due to, for example, the influence of a temperature change or the like. Accordingly, the image display devices of the related art have a problem that misalignment of the image to be displayed may occur in each scanning line, for example, in each line in the horizontal direction, due to the variation.

To solve the above-mentioned problem, an embodiment provides an image display device including: a light source unit configured to output a light beam; a scanning unit configured to reflect the light beam and repeat a reciprocating operation in a predetermined scanning direction; a scanning detection unit configured to detect a first operation range of the scanning unit in each forward or reverse scanning line of the reciprocating operation and a second operation range of the scanning unit in each reciprocation of the reciprocating operation; a display position determination unit configured to determine an image display position in each scanning line based on a first difference between the detected first operation range and a first reference value for the forward or reverse line and a second difference between the detected second operation range and a second reference value for the reciprocating operation; and a light source driving unit configured to drive the light source unit based on image data at a timing corresponding to the determined image display position.

The embodiment also provides a control method of an image display device, the image display device including: a light source unit configured to output a light beam; and a scanning unit configured to reflect the light beam and repeat a reciprocating operation in a predetermined scanning direction, the control method including: detecting a first operation range of the scanning unit in each forward or reverse scanning line of the reciprocating operation and a second operation range of the scanning unit in each reciprocation of the reciprocating operation; determining an image display position in each scanning line based on a first difference between the detected first operation range and a first reference value for the forward or reverse line and a second difference between the detected second operation range and a second reference value for the reciprocating operation; and driving the light source unit based on image data at a timing corresponding to the determined image display position.

BRIEF DESCRIPTION OF THE DRAWINGS

FIG. 9A is an explanatory diagram for explaining an operation according to a reference example 1;

DETAILED DESCRIPTION

First Embodiment

A first embodiment of the present invention will be described below with reference to the drawings.

Figure 1:
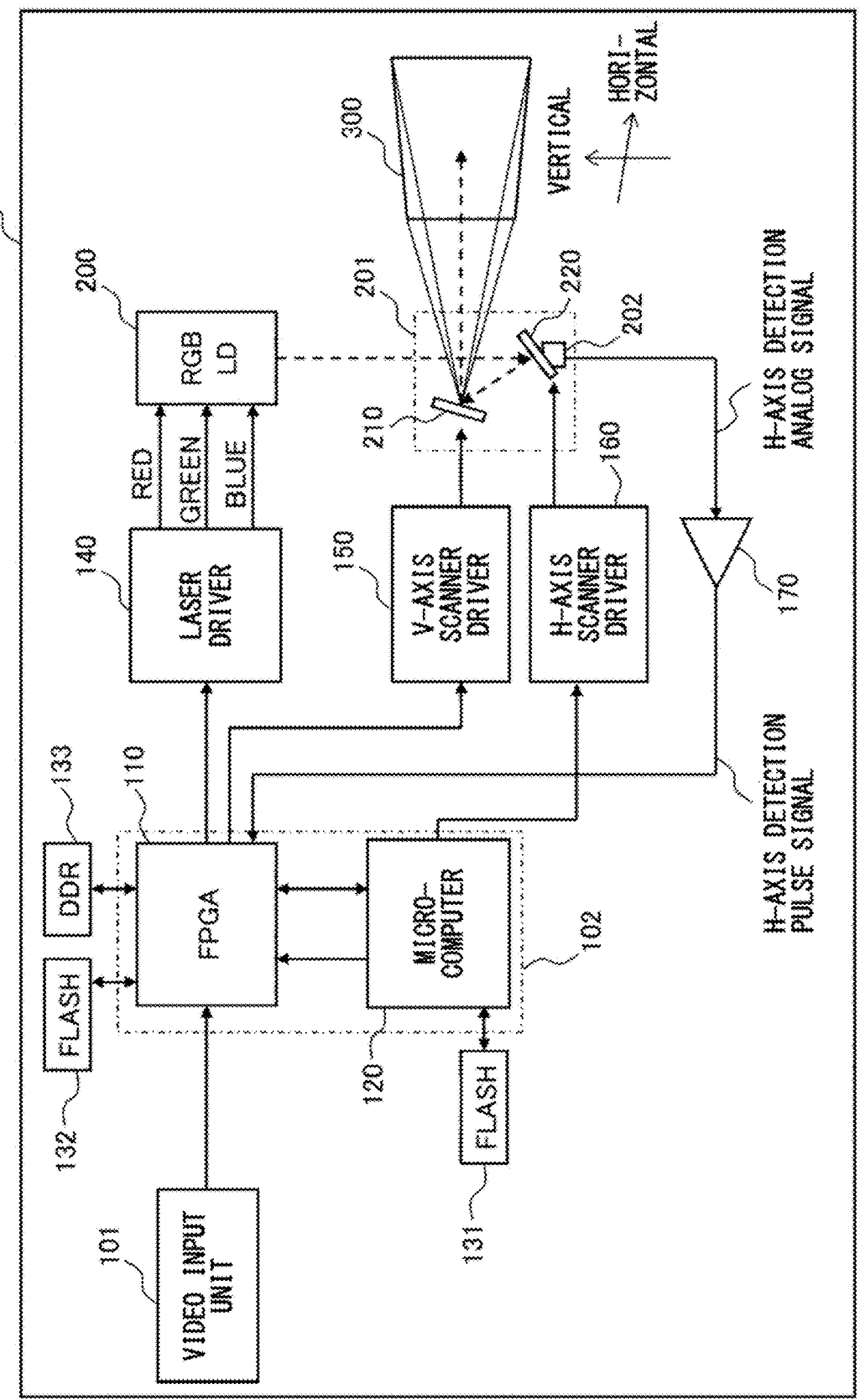
FIG. 1 is a block diagram showing a configuration example of an image display device according to a first embodiment.

FIG. 1 shows a configuration of an image display device 100 according to this embodiment. The image display device 100 is an image display device of a laser scan system that reflects laser light using an optical scanner, and scans the reflected laser light in a reciprocating manner in the vertical direction and the horizontal direction, thereby displaying (drawing) an image on a plane of projection. For example, the image display device 100 projects and displays a projected image 300 on the plane of projection which is an image display surface of, for example, a windshield or a combiner of a vehicle.

As shown in FIG. 1, the image display device 100 includes a video input unit 101, an FPGA (Field Programmable Gate Array) 110, microcomputer 120, flash memories 131 and 132, a DDR (Double Data Rate) memory 133, a laser driver 140, a V-axis scanner driver 150, an H-axis scanner driver 160, a comparator 170, an RGB laser diode 200, a vertical scanner 210, and a horizontal scanner 220. The vertical direction (longitudinal direction, Y-direction) of an image to be displayed is also referred to as a V (Vertical)-axis direction, and the horizontal direction (lateral direction, X-direction) of the image is also referred to as an H (Horizontal)-axis direction.

The video input unit 101 receives video data to be displayed on the plane of projection, and sends the received video data to the FPGA 110. This video data includes three color signals, i.e., R (red), G (green), B (blue) color signals. For example, the video input unit 101 may receive a video generated by other devices such as a car navigation system, and the video input unit 101 may generate video data.

The FPGA 110 and the microcomputer 120 constitute a control unit 102 of the image display device 100, and perform various control operations necessary for image display. The FPGA 110 and the microcomputer 120 control the operations of the RGB laser diode 200, the vertical scanner 210, and the horizontal scanner 220 through the laser driver 140, the V-axis scanner driver 150, and the H-axis scanner driver 160, and draw the projected image 300. The control operations of the FPGA 110 and the microcomputer 120 may be implemented by hardware or software, or a combination thereof.

The FPGA 110 outputs, line by line, RGB image data based on the input video data, generates a V-axis drive signal for controlling the reciprocating operation of the vertical scanner 210, and outputs the generated V-axis drive signal. The FPGA 110 according to this embodiment sets the drawing position of the image so that misalignment of the image in each line can be prevented, as described later, based on an H-axis detection pulse signal of the horizontal scanner 220 that is obtained from the comparator 170. Then, the FPGA 110 drives the laser driver 140 to draw the image at the set position.

The microcomputer 120 generates an H-axis drive signal for controlling the reciprocating operation of the horizontal scanner 220, and outputs the generated H-axis drive signal. The flash memory 131 and the flash memory 132 are non-volatile storage units that store data, programs, and the like necessary for the operation of the microcomputer 120 and the FPGA 110, respectively.

The DDR (Double Data Rate) memory 133 is a frame buffer that temporarily stores video data to be input to the FPGA 110. The DDR memory 133 may be an SDRAM such as DDR 2 or DDR 3.

The laser driver 140 drives the RGB laser diode 200 according to the image data supplied from the FPGA 110. The laser driver 140 is a light source driving unit that drives the RGB laser diode 200 based on the image data at a timing corresponding to the image display position determined by the FPGA 110. The RGB laser diode 200 is driven by the laser driver 140 to emit laser light of three colors, i.e., R, G, and B. The RGB laser diode 200 is a light source unit that outputs laser light which is a light beam.

The V-axis scanner driver 150 drives the vertical scanner 210 in a reciprocating manner according to the V-axis drive signal supplied from the FPGA 110. The H-axis scanner driver 160 drives the horizontal scanner 220 in a reciprocating manner according to the H-axis drive signal supplied from the microcomputer 120.

The vertical scanner 210 or the horizontal scanner 220 is a scanning unit that repeats a reciprocating operation in the vertical direction or the horizontal direction. The vertical scanner 210 is an optical scanner that reflects the laser light applied from the RGB laser diode 200, and is driven by the V-axis scanner driver 150 to perform the reciprocating operation in the vertical direction. The horizontal scanner 220 is an optical scanner that reflects the laser light applied from the RGB laser diode 200, and is driven by the H-axis scanner driver 160 to perform the reciprocating operation in the horizontal direction. In this embodiment, the horizontal scanner 220 repeats the reciprocating operation so as to be equally on left and right sides, i.e., to be equal a forward operating range and a reverse operating range. The horizontal scanner 220 includes a scanning detection unit 202 that detects the reciprocating operation in the horizontal direction, and outputs an H-axis detection analog signal representing the detected reciprocating operation. The scanning detection unit 202 detects a first operation range that is an operation range of the horizontal scanner 220 in each forward or reverse scanning line of the reciprocating operation and detects a second operation range that is an operation range of the horizontal scanner 220 in each reciprocation of the reciprocating operation.

In this example, the horizontal scanner 220 reflects the laser light from the RGB laser diode 200 and the vertical scanner 210 further reflects the reflected light from the horizontal scanner 220, thereby drawing the projected image 300 on the plane of projection. It can also be said that the vertical scanner 210 and the horizontal scanner 220 constitute the optical scanner 201 that performs a reciprocating scanning operation in the vertical direction and the horizontal direction. For example, the vertical scanner 210 and the horizontal scanner 220 may be configured as one two-axis (two-dimensional) optical scanner.

The comparator 170 is a signal conversion unit that converts the H-axis detection analog signal, which is output from the horizontal scanner 220, into the H-axis detection pulse signal which can be processed by the FPGA 110. The scanning detection unit may be configured to include the scanning detection unit 202 and the comparator 170. The scanning detection unit may be configured to include the scanning detection unit 202, the comparator 170, and a signal adjustment unit 118 described later.

Figure 2:
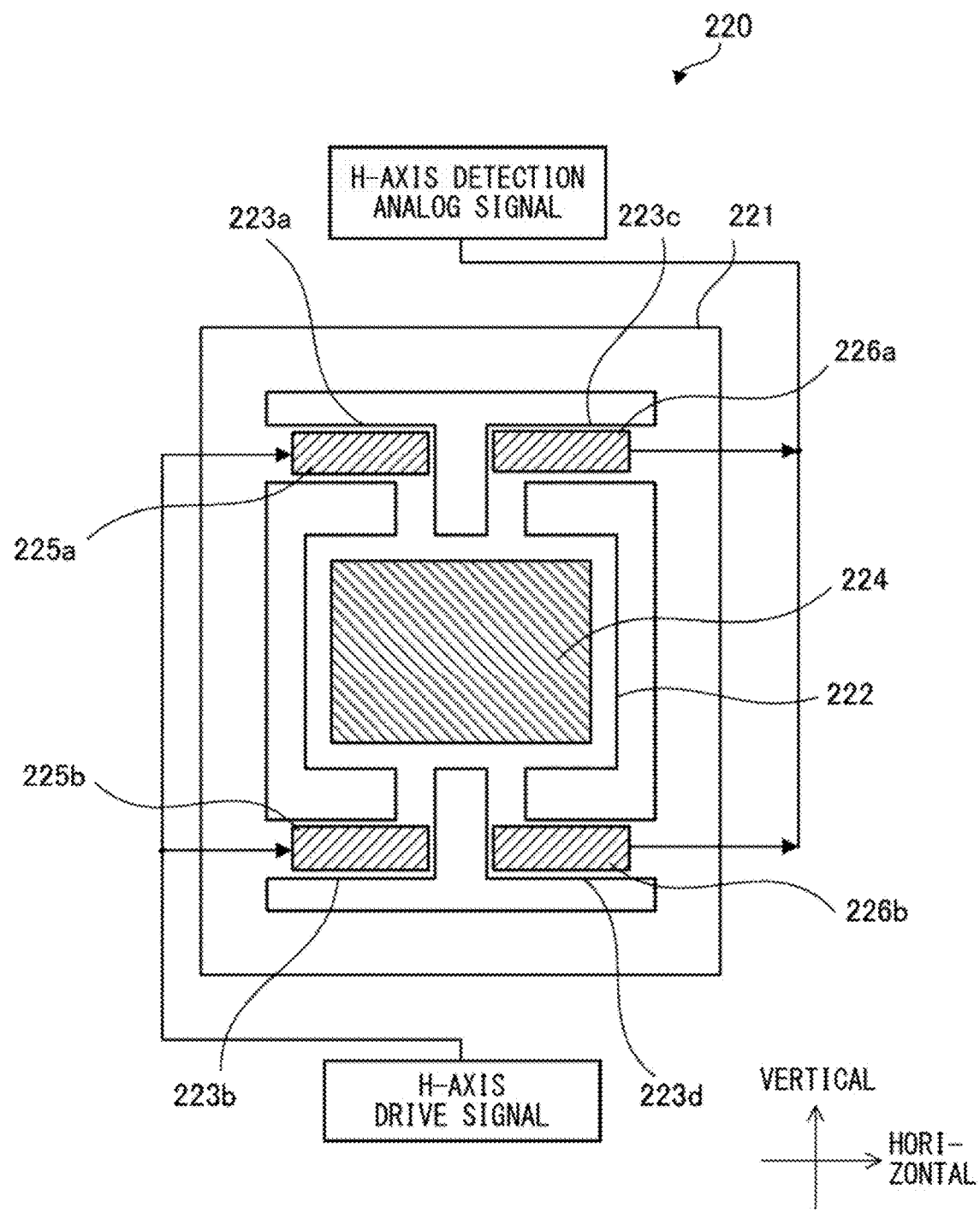
FIG. 2 is a block diagram showing an example of a configuration of a horizontal scanner according to the first embodiment.
Figure 3:
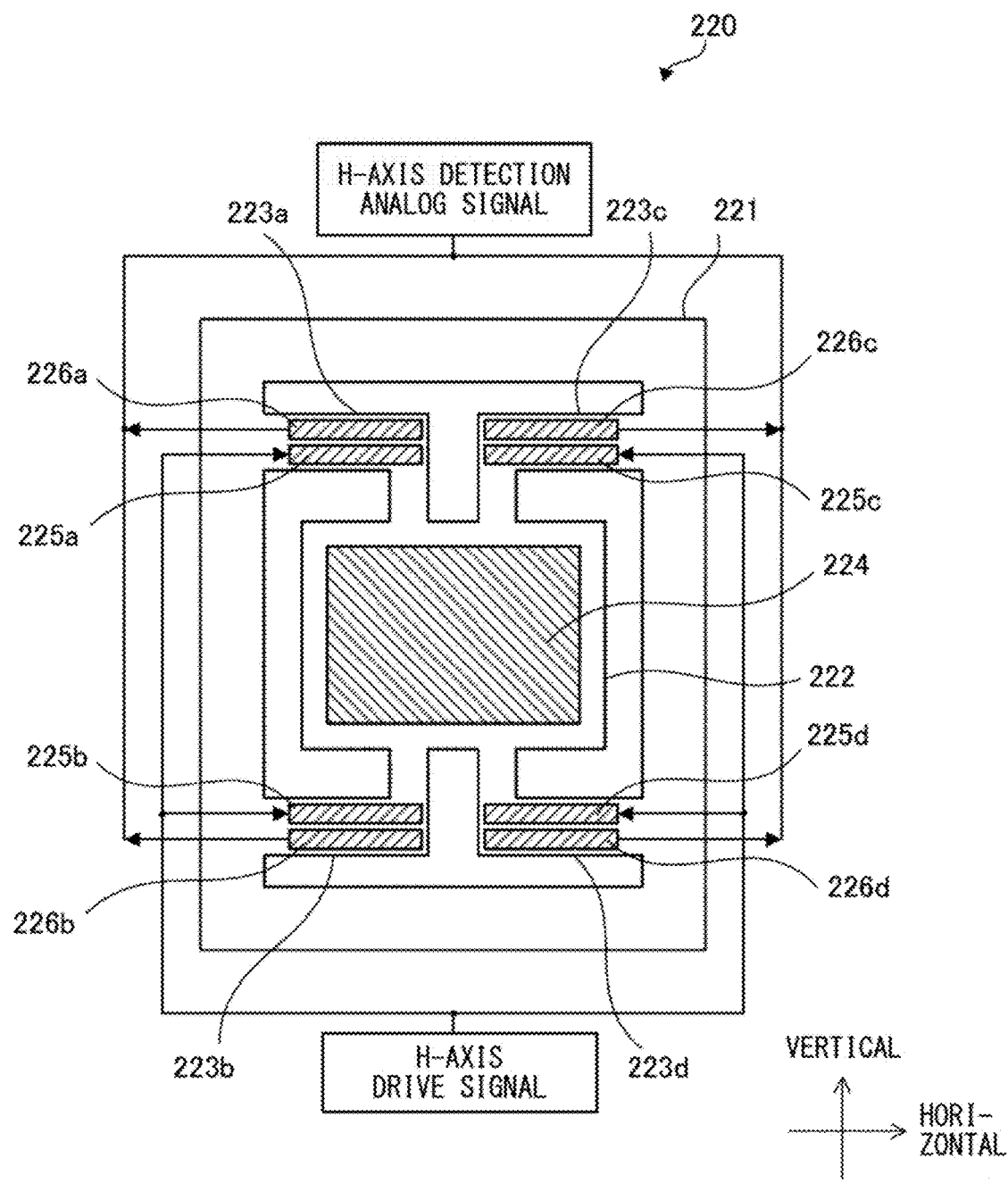
FIG. 3 is a block diagram showing another example of the configuration of the horizontal scanner according to the first embodiment.

FIGS. 2 and 3 are front views showing configuration examples of the horizontal scanner 220 as viewed from the mirror side. The vertical scanner 210 may be configured in the same manner as the horizontal scanner 220.

The optical scanner serving as the horizontal scanner 220 (and the vertical scanner 210) is a MEMS element created by a MEMS (Micro Electro Mechanical Systems) technique. For example, the horizontal scanner 220 is formed by etching an SOI (Silicon On Insulator) substrate including a piezoelectric film such as a PZT (lead zirconate titanate) film.

As shown in FIGS. 2 and 3, the horizontal scanner 220 includes a frame body 221 which constitutes a frame of a body; a rocking piece 222 which is supported in a state where it is separated from the frame body 221; four L-shaped beam portions 223a to 223d which connect the inner edge of the frame body 221 with the rocking piece 222; and a MEMS mirror 224 which is formed on the surface of the rocking piece 222. The MEMS mirror 224 is formed by depositing a metal (for example, Al or Au) having a high reflectivity.

The L-shaped beam portions 223a to 223d are connected to the rocking piece 222 at a location close to the center of the rocking piece 222 in the horizontal direction, and the rocking piece 222 and the MEMS mirror 224 are rockable in the horizontal direction with the connected portion as a rocking shaft. It can also be said that the L-shaped beam portions 223a to 223d constitute a torsion bar that rockably supports the rocking piece 222.

A plurality of piezoelectric films extending in the horizontal direction are disposed on the four L-shaped beam portions 223a to 233d, respectively. For example, the piezoelectric films each have a stacked structure in which a piezoelectric film is sandwiched between a lower electrode and an upper electrode.

In the example shown in FIG. 2, driving piezoelectric films 225a and 225b, each of which is supplied with the H-axis drive signal, are disposed on the L-shaped beam portions 223a and 223b, respectively, and detection piezoelectric films 226a and 226b to detect the operation of the MEMS mirror 224 (rocking piece 222) are disposed on the L-shaped beam portions 223c and 223d, respectively, which are opposed to the L-shaped beam portions 223a and 223b, respectively.

In the example shown in FIG. 3, pairs of a driving piezoelectric film and a detection piezoelectric film (225a and 226a, 225b and 226b, 225c and 226c, and 225d and 226d) are disposed on the L-shaped beam portions 223a to 223d, respectively.

When the H-axis drive signal is supplied to the driving piezoelectric films 225a and 225b shown in FIG. 2 or to the driving piezoelectric films 225a to 225d shown in FIG. 3, the driving piezoelectric films 225a and 225b or the driving piezoelectric films 225a to 225d are oscillated according to the H-axis drive signal. This oscillation is transmitted to the rocking piece 222 via the L-shaped beam portions 223a and 223b or the L-shaped beam portions 223a to 223d, thereby allowing the rocking piece 222 and the MEMS mirror 224 to oscillate.

The detection piezoelectric films 226a and 226b shown in FIG. 2, or the detection piezoelectric films 226a to 226d shown in FIG. 3, which correspond to the scanning detection unit 202, detect the oscillation of the rocking piece 222 and the MEMS mirror 224, and output the H-axis detection analog signal according to the detected oscillation. The H-axis drive signal having a predetermined phase difference with respect to the H-axis detection analog signals, which are obtained from the detection piezoelectric films 226a and 226b or from the detection piezoelectric films 226a to 226d, is fed back to the driving piezoelectric films 225a and 225b or to the driving piezoelectric films 225a to 225d, thereby allowing the rocking piece 222 and the MEMS mirror 224 to be resonantly driven.

Figure 4:
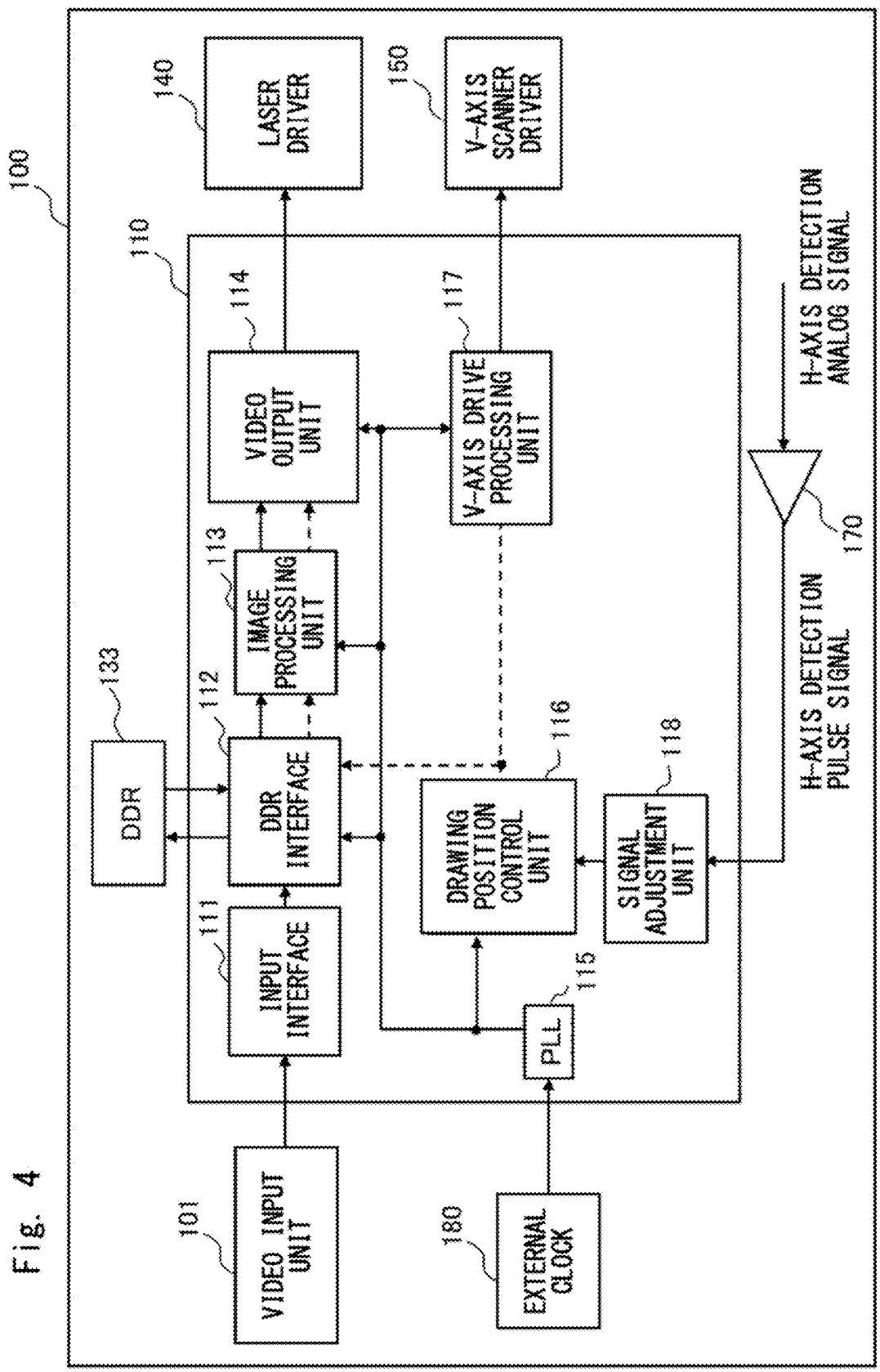
FIG. 4 is a block diagram showing a configuration example of an FPGA according to the first embodiment.

FIG. 4 shows functional blocks of the FPGA 110 according to this embodiment. As shown in FIG. 4, the FPGA 110 includes an input interface 111, a DDR interface 112, an image processing unit 113, a video output unit 114, a PLL (Phase Locked Loop) 115, a drawing position control unit 116, a V-axis drive processing unit 117, and a signal adjustment unit 118.

The input interface 111 is an interface between the FPGA 110 and the video input unit 101. The input interface 111 receives video data input from the video input unit 101, and outputs the received video data to the DDR interface 112.

The DDR interface 112 is an interface between the FPGA 110 and the DDR memory 133. The DDR interface 112 temporarily stores the received video data received by the input interface 111 in the DDR memory 133, and retrieves the video data stored in the DDR 133 according to an internal clock.

The DDR interface 112 writes the video data (image data) into the DDR memory 133 in units of frames, and reads out, from the DDR memory 133, the image data line by line in one frame in the horizontal direction in synchronization with the internal clock. Further, since drawing is performed in forward and reverse lines in the reciprocating operation of the horizontal scanner 220, the DDR interface 112 reads out the image data in the forward order of addresses in the forward line for the drawing operation, and the DDR interface 112 reads out the image data in the reverse order of addresses in the reverse line for the drawing operation. Thus, the image data in the forward line and the image data in the reverse line are sorted.

The image processing unit 113 performs necessary image processing, such as a change of an aspect ratio and bright control, on the image data retrieved from the DDR 133 by the DDR interface 112. The video output unit (image output unit) 114 outputs, to the laser driver 140, the image data on which the image processing is performed by the image processing unit 113. The video output unit 114 determines a drawing position by using a drawing position clock (pixel clock), which is generated by the H-axis detection waveform and the V-axis drive signal, and HSync (H-axis sync signal) and VSync (V-axis sync signal), and outputs the image data line by line at a timing corresponding to the determined drawing position.

The PLL 115 receives an external clock 180, generates an internal clock based on the external clock 180, and supplies the generated internal clock to each block.

The signal adjustment unit 118 generates the H-axis drawing position setting signal by delaying the H-axis detection pulse signal generated by the comparator 170 by a predetermined delay time. The signal adjustment unit 118 outputs the generated H-axis drawing position setting signal to the drawing position control unit 116. For example, the delay time by which the signal adjustment unit 118 delays the signal is stored in the flash memory 132 as a drawing start position adjustment value. The signal adjustment unit 118 may be provided outside the FPGA 110.

The drawing position control unit (clock generation unit) 116 generates a pixel clock based on the internal clock generated by the PLL 115 so that the horizontal scanner 220 is synchronized with the laser drawing. The pixel clock is, for example, a clock synchronous with a pixel counter which is described later. The drawing position control unit 116 generates the pixel clock, the HSync, and the VSync to determine the drawing position based on the V-axis drive signal and the H-axis drawing position setting signal that is based on the H-axis detection pulse signal. The drawing position control unit 116 starts counting of the counter from the edge position of the H-axis drawing position setting signal, and determines the drawing area according to the counted counter value. The drawing position control unit 116 is a display position determination unit that determines the image display position for each line based on a first difference between a first operation range of the forward or reverse line of the horizontal scanner 220 detected by the scanning detection unit 202 and a first reference value and a second difference between a detected second operation range of the reciprocating operation of the horizontal scanner 220 and a second reference value. As described later, the drawing position control unit 116 corrects a counting start position of the counter for each scanning line based on a difference between a count value obtained by counting the first operation range of the forward or reverse line and a count value corresponding to the first reference value and a difference between a count value obtained by counting the second operation range of the reciprocating operation and a count value corresponding to the second reference value. For example, the first and second reference values are stored in the flash memory 132.

The V-axis drive processing unit 117 generates the V-axis drive signal based on the HSync and VSync, and outputs the generated V-axis drive signal to the V-axis scanner driver 150. For example, in the case of a VGA (Video Graphics Array) display, the vertical scanning frequency is 60 Hz, and the V-axis drive signal is output so that the vertical scanner 210 is oscillated in the vertical direction at 60 Hz.

Figure 5:
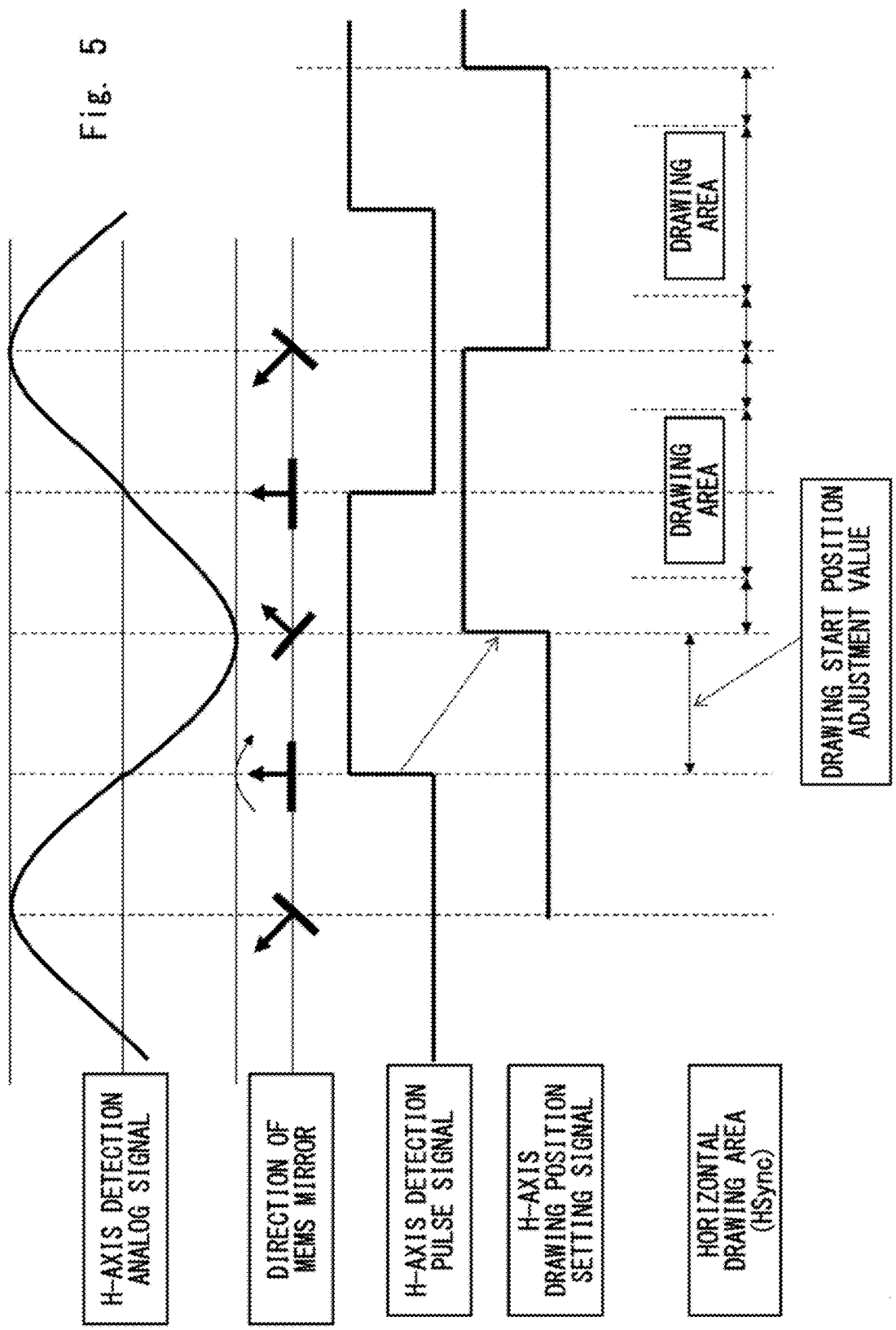
FIG. 5 is a waveform chart showing examples of signals used for the image display device according to the first embodiment.

FIG. 5 shows an example of the H-axis detection analog signal, the H-axis detection pulse signal, and the H-axis drawing position setting signal according to this embodiment. The H-axis detection analog signal has a waveform detected by one of the piezoelectric films (for example, the detection piezoelectric films 226a and 226b shown in FIG. 2, or the detection piezoelectric films 226a to 226d shown in FIG. 3) which are disposed on both sides of the horizontal scanner 220 which is driven on both sides thereof in the horizontal direction.

As shown in FIG. 5, the H-axis detection analog signal has an analog waveform depending on the direction of the MEMS mirror 224 of the horizontal scanner 220. For this reason, the H-axis detection analog signal cannot be directly processed by the FPGA 110. Accordingly, in this embodiment, the H-axis detection analog signal is converted into a pulse-like rectangular wave by using the comparator 170 or the like, and the H-axis detection pulse signal that can be processed by the FPGA 110 is generated.

There is a case where the timing of the H-axis detection pulse signal output from the comparator 170 does not coincide with the timing of the reciprocating operation of the MEMS mirror 224. In this case, it is impossible to draw correctly if the drawing area is set according to the H-axis detection pulse signal. For example, in FIG. 5, the rising and falling edges of the H-axis detection pulse signal are repeated when the MEMS mirror 224 is in the front (center) direction.

Therefore, in this embodiment, in order to set the appropriate drawing position, the signal adjustment unit 118 of the FPGA 110 generates a H-axis drawing position setting signal that is obtained by shifting (delaying) the H-axis detection pulse signal as appropriate, i.e., by an amount equivalent to a drawing start position adjustment value. By delaying the H-axis detection pulse signal by the drawing start position adjustment value, the H-axis drawing position setting signal is generated so that the edge of the signal is located at a position where the MEMS mirror 224 is swung by the maximum angle. Then, the drawing area in the horizontal direction is set in the area between the edges of the H-axis drawing position setting signal.

Figure 6:
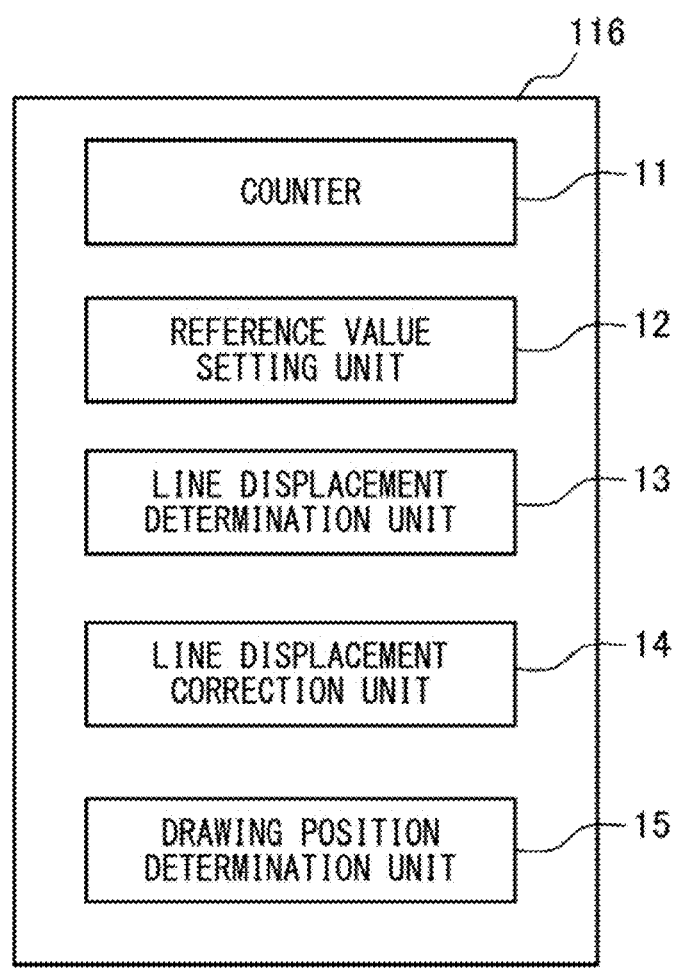
FIG. 6 is a block diagram showing a configuration example of a drawing position control unit according to the first embodiment.
Figure 7:
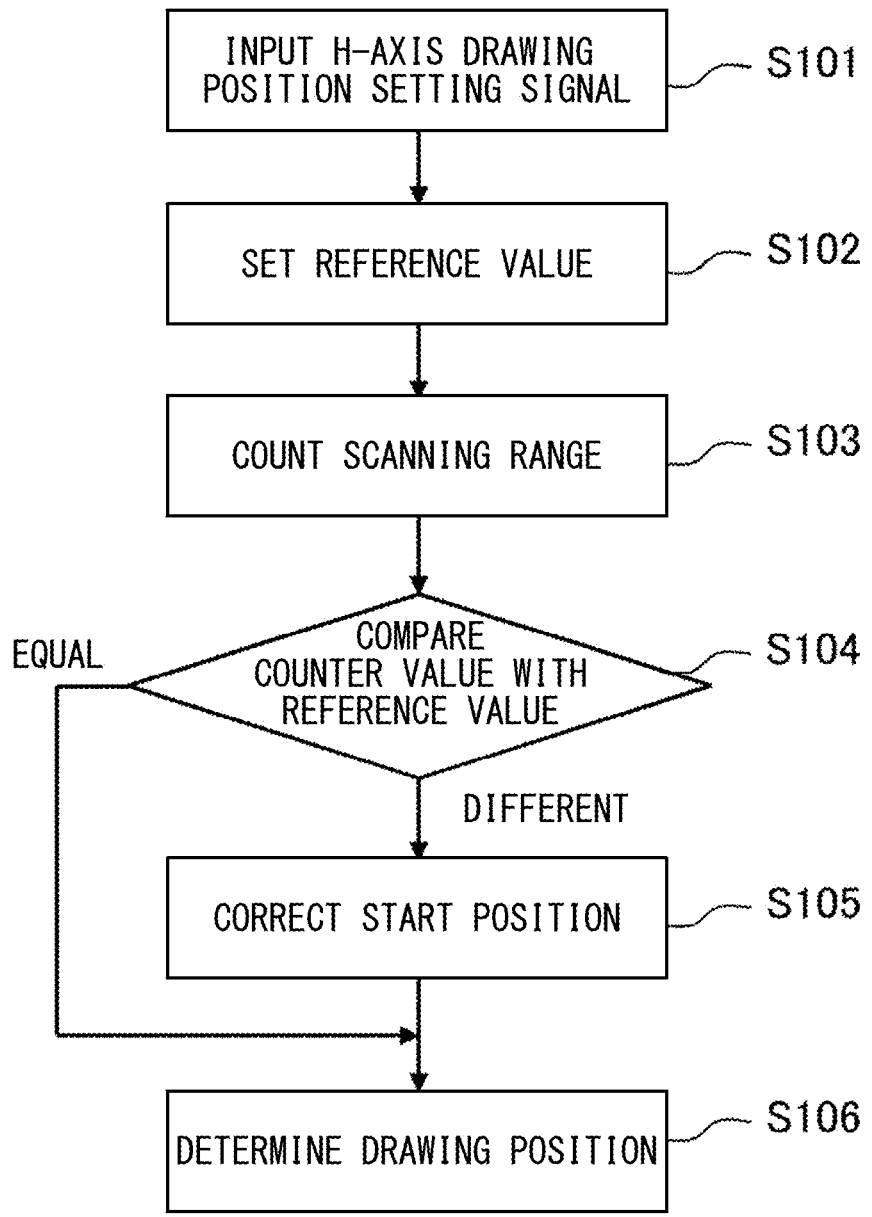
FIG. 7 is a flowchart showing an operation example of the drawing position control unit according to the first embodiment.

Next, a configuration example for implementing the operation according to this embodiment will be described. FIG. 6 is an example of functional blocks of the drawing position control unit 116. FIG. 7 is an example of a flowchart for the drawing position control unit 116. The operation may be implemented by other configurations, provided that the operation according to this embodiment described below can be implemented.

As shown in FIG. 6, the drawing position control unit 116 includes a counter 11, a reference value setting unit 12, a line displacement determination unit 13, a line displacement correction unit 14, and a drawing position determination unit 15.

The counter 11 is a counter that counts the edge intervals of the H-axis drawing position setting signal. The counter 11 includes the clock counter and the pixel counter, which are described later. The reference value setting unit 12 sets, as a reference value, a first reference value that is an operation range for the forward or reverse line and a second reference value that is an operation range for the reciprocating operation.

The line displacement determination unit 13 compares the value of the counter 11 with the first reference value, and with the second reference value. Then the line displacement determination unit 13 determines a displacement of the line. The line displacement correction unit 14 corrects the counting start position as described later to correct the determined line displacement. The drawing position determination unit 15 determines the drawing position (drawing area) based on the value of the counter 11 of which the counting start position is corrected.

As shown in FIG. 7, the H-axis drawing position setting signal starts to be input to the drawing position control unit 116 (S101), and the line reference value setting unit 12 sets the reference value (S102). The first and second reference values, which are the reference value, may be previously set, or may be set based on a result that is obtained by counting the edge intervals of the H-axis drawing position setting signal a plurality of times.

Next, the counter 11 counts the scanning range of the MEMS mirror (S103). The counter 11 is synchronous with the internal clock and counts the edge intervals of the H-axis drawing position setting signal by using the clock counter (clk_cnt) and the pixel counter (pix_cnt) as described later.

Next, the line displacement determination unit 13 compares the counter value with the reference value (S104). Specifically, as described later, the line displacement determination unit 13 obtains a difference between the counter value of the forward or reverse line and the first reference value, and a difference between the counter value of the reciprocation and the second reference value. In S104, when there is a difference between the counter value and the reference value, the line displacement correction unit 14 corrects the counting start position based on the difference (S105). Specifically, the line displacement correction unit 14 obtains a first difference between the counter value of the forward or reverse line and the first reference value, and a second difference between the counter value of the reciprocation and the second reference value, and then uses the half value of a difference between the first and second differences as the correction value.

The drawing position determination unit 15 determines the drawing position based on the counter value as it is when there is no difference between the counter value and the reference value, and determines the drawing position based on the corrected counter value when there is a difference between the counter value and the reference value (S106). For example, the drawing position determination unit 15 sets the area from the counter value 5 to the counter value 14 as the drawing area, and generates the HSync which repeatedly rises at the timing corresponding to the counter value 5 and falls at the timing corresponding to the counter value 14.

Next, a drawing position control method that is a main feature of this embodiment will be described.

In the image display device adopting the laser scan method, when drawing is performed, the H-axis detection waveform (H-axis detection pulse signal), which is obtained by detecting the operation of the MEMS mirror 224 output from a detection circuit such as a piezoelectric film, is fed into the FPGA 110 and used as a reference signal for a drawing timing.

However, due to the temperature characteristics of the MEMS mirror 224, there is a case where a swing angle of the MEMS mirror 224 is varied and hence the detection waveform is varied. This variation of the detection waveform causes a deviation in the number of counts of the detection waveform in the FPGA 110 and hence a deviation in the drawing timing, which results in a misalignment in each line of the drawn projected image 300. This problem is solved as follows.

Figure 8A:
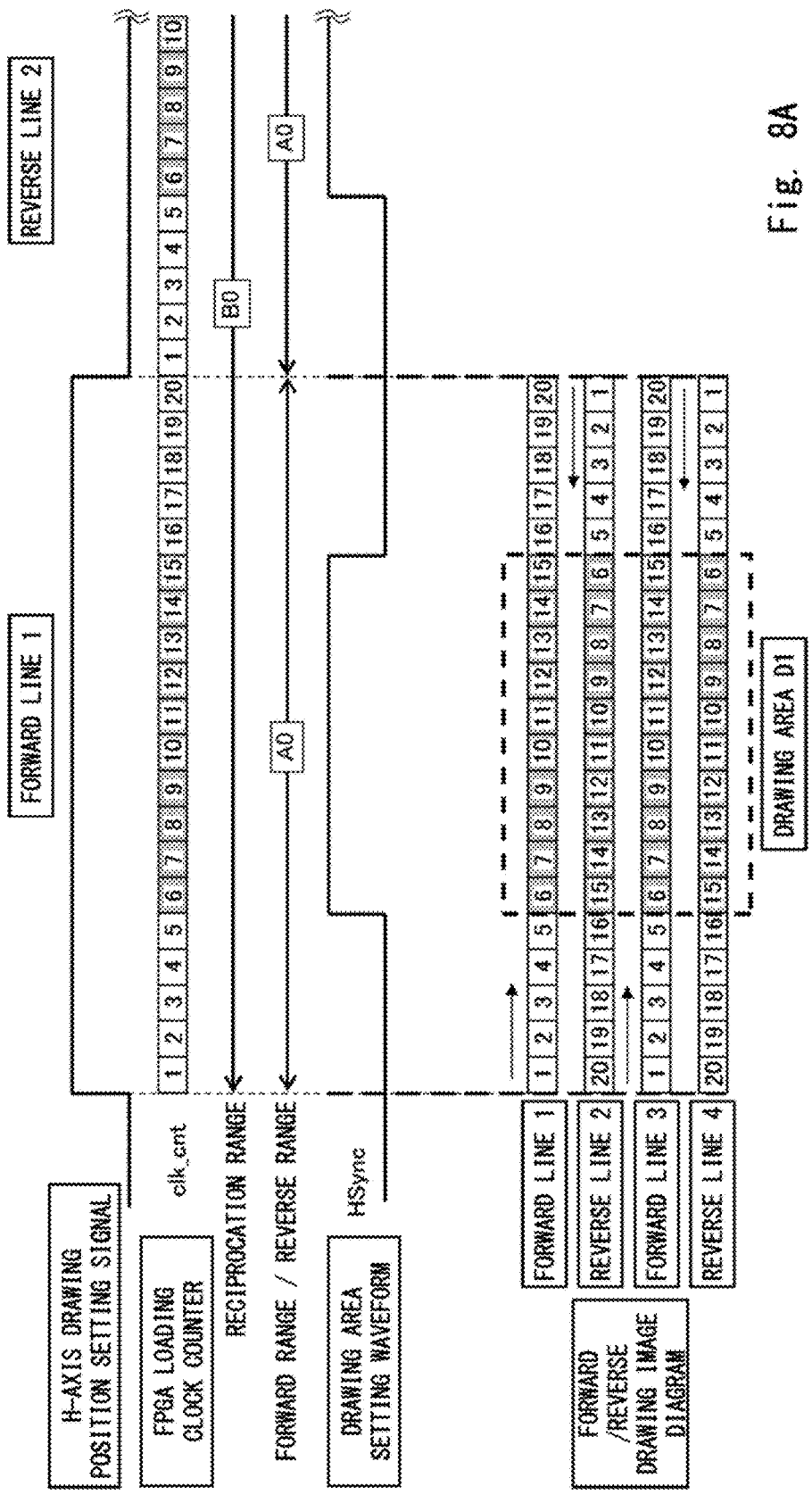
FIG. 8A is an explanatory diagram for explaining an operation according to an ideal example.
Figure 8B:
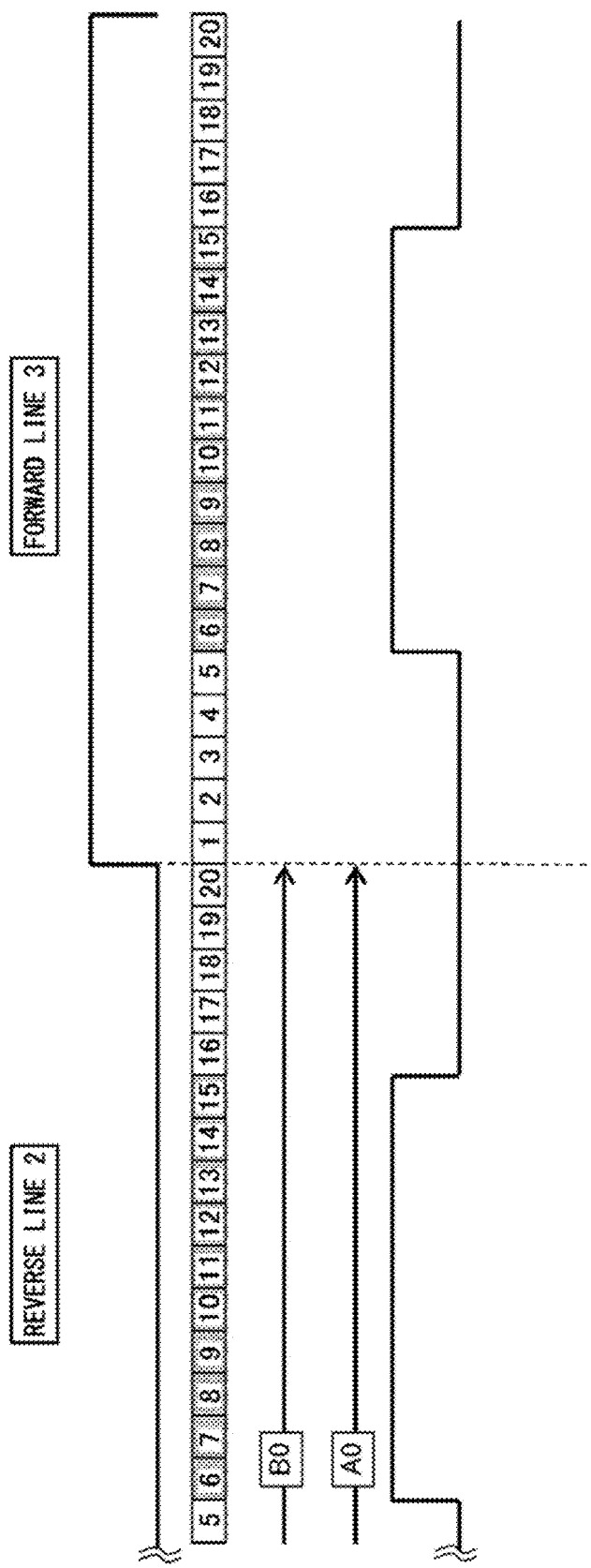
FIG. 8B is an explanatory diagram for explaining the operation according to the ideal example.

In the following operation example, the exact edge position of the detection waveform (H-axis detection pulse signal) is unknown in the actual operation of the MEMS mirror 224. Therefore, as described above, the H-axis drawing position setting signal is generated by shifting the detection waveform as appropriate and the drawing position is set on the basis of the H-axis drawing position setting signal. Because of this setting of the H-axis drawing position setting signal, it is possible to set the drawing area at the position which causes no problem in the drawing in the forward and reverse operations. In the following operation example, for convenience of the explanation, it is assumed that a fixed value is set as the position adjustment value of the H-axis drawing position setting signal at the Ideal Example First, the operation of an ideal detection signal will be described with reference to FIGS. 8A and 8B. FIGS. 8A and 8B show an example according to the same configuration as those of FIGS. 1 to 3, and FIG. 5.

As shown in FIGS. 8A and 8B, the H-axis drawing position setting signal based on the H-axis detection pulse signal ideally has a detection waveform with a constant period, i.e., a rectangular wave in which High and Low are repeated at regular edge intervals (at regular intervals between a rising edge and a subsequent falling edge, or at regular intervals between a falling edge and a subsequent rising edge).

The FPGA 110 counts the edge intervals of the H-axis drawing position setting signal by using the internal clock synchronous with dots (pixels). Since the H-axis drawing position setting signal has a constant period, the counter value of a clock counter (clk_cnt) is constant. In this case, for example, an edge interval corresponds to 20 counts and counting from a counter values=1 to a counter value=20 is repeated. More specifically, the counter value (the number of counts) of each ideal operation range is as follows: the forward or reverse range A0 is 20 and the reciprocation range B0 is 40. This ideal forward or reverse range A0 is a first reference value and the ideal reciprocation range B0 is a second reference value. For simplification of the explanation, counting is started from the counter value=1. However, counting may be started from the counter value=0 (the same applies hereinafter).

In this case, for example, the area between counter values 6 to 15 is set as the drawing area. As a result, the HSync for setting the drawing area has a waveform in which the signal repeatedly rises at the timing of the counter value 6 and falls at the timing of the counter value 15 in each of the forward and reverse operations. As a result, the drawing area for the projected image 300 which is drawn by a repetition of the forward line and the reverse line corresponds to an area D1. Referring to FIGS. 8A and 8B, the H-axis drawing position setting signal has a constant period and the HSync also has a constant period. Accordingly, the forward range, the reverse range, and the reciprocation range have the reference values at all times. Therefore, in the ideal drawing area D1, no deviation occurs in the drawing position in each line, so that the drawing area becomes a rectangular area whose longitudinal lines in the vertical direction are aligned with each other.

Reference Example 1

For example, there is a case where the frequency of the MEMS minor is changed due to temperature characteristics or the like and the period of the detection waveform is changed. In this case, naturally, it is considered that the MEMS minor uniformly operates both in the forward line and the reverse line and hence it is ideal that the forward line and the reverse line are also uniform (or equivalent to each other) in the detection waveform. However, due to an influence of circuits and the like, a detection waveform different from the actual behavior of the MEMS minor could be obtained. If this detection waveform is fed into the FPGA and a timing waveform for drawing on the basis of the counter value is generated for the drawing, the vertical line is deviated from the ideal state because the number of counts in the forward and reverse operations are different from the original setting value (the reference value) in the drawing area.

Figure 9B:
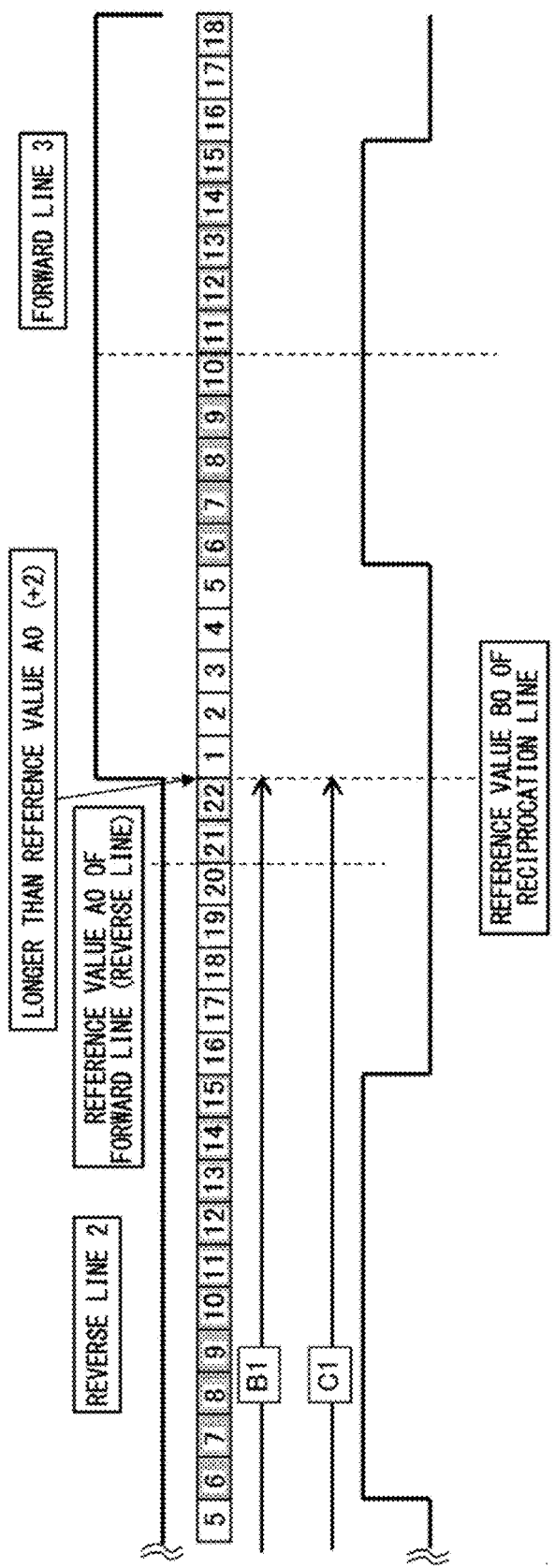
FIG. 9B is an explanatory diagram for explaining the operation according to the reference example 1.

FIGS. 9A and 9B show an example in which such a deviation occurs in the drawing area. FIGS. 9A and 9B show an operation example where the detection signal is varied in the reference example 1 to which this embodiment is not applied. For example, FIGS. 9A and 9B show an example according to configurations similar to those of FIGS. 1 to 3 and 5.

As shown in FIGS. 9A and 9B, in the reference example 1, when the operation of the MEMS minor 224 is varied, the frequency (edge interval) of the H-axis drawing position setting signal based on the H-axis detection pulse signal is not constant but instead varies. When the H-axis drawing position setting signal is fed into the FPGA 110 and counted, the counter value of the clock counter varies in each edge interval.

The reference example 1 is an example in which: the forward range is smaller than the reference value; the reverse range is longer than the reference value; and the reciprocation range is equal to the reference value. That is, the counter values (the number of counts) for these operation ranges are as follows: the forward range A1 is 18 which is smaller than the reference value A0=20 by 2; the reverse range C1 is 22 which is larger than the reference value A0=20 by 2; and the reciprocation range B1 is 40 which is equal to the reference value B0=40.

When the range from the counter value 6 to the counter value 15 is set as the drawing area, the HSync for setting the drawing area has a waveform in which the signal repeatedly rises at the timing corresponding to the counter value 6 and falls at the timing corresponding to the counter value 15 in each of the forward and reverse lines in which the edge interval (the number of counts) varies.

In this example, even if the detection waveform varies for some reason, the drawing area is set, under the condition that the swing of the MEMS mirrors on the left side is equal to the swing on the right side, such that half of the total number of counts of the reciprocation range is substantially equal to the number of counts of the forward or reverse line (the same applies hereinafter). There is a case where the circuit characteristic for generating the rising edge differs from that for generating the falling edge. However, when viewed from only one side of the edges, these characteristics are the same. Thus, it is considered that the number of the counts which are counted on the basis of the one side of the edges become the total number of the counts of the reciprocation range, and half of the total number of counts becomes the forward or reverse deflection of the MEMS mirror.

The drawing area for the projected image 300 which is drawn by the repetition of the forward line and the reverse line corresponds to an area D2. In FIGS. 9A and 9B, the period (edge interval) of the H-axis drawing position setting signal varies and the period of the HSync also varies. Accordingly, a deviation occurs in each line in the drawing area D2. In this example, since the reciprocation range B1 corresponds to 40 counts, it is concluded that the forward or reverse line corresponds to 20 counts, which is half of the counts of the reciprocation. Thus, the drawing area is formed by turning back every 20 counts as shown in FIG. 9A. Specifically, the forward line corresponds to the counter values =1, 2, . . . , 18, 1, and 2, and the reverse line corresponds to the counter values =3, 4, . . . , 21 and 22. Then, the positions corresponding to the counter values 6 to 15 in the forward line are deviated by two counts (2 clocks) from the positions corresponding to the counter values 6 to 15 in the reverse line. Therefore, the deviation occurs in the counter value and in the operation of the MEMS mirror, causing the deviation of the drawing area.

That is, in the reference example to which the embodiment is not applied, when the detection waveform varies from the original state set as the <ideal example>due to the change of an angle of view and/or the temperature characteristics, the number of counts varies from the initial setting number of counts (the reference value) and the deviation in drawing occurs. In the reference example, drawing is performed by generating the timing waveform (HSync) for drawing based on the counter value of the H-axis drawing position setting signal. Accordingly, when the number of counts in the forward line is different from the number of counts in the reverse line, the longitudinal line deviates in the drawing area.

Operation Example 1 According to this Embodiment

Figure 10A:
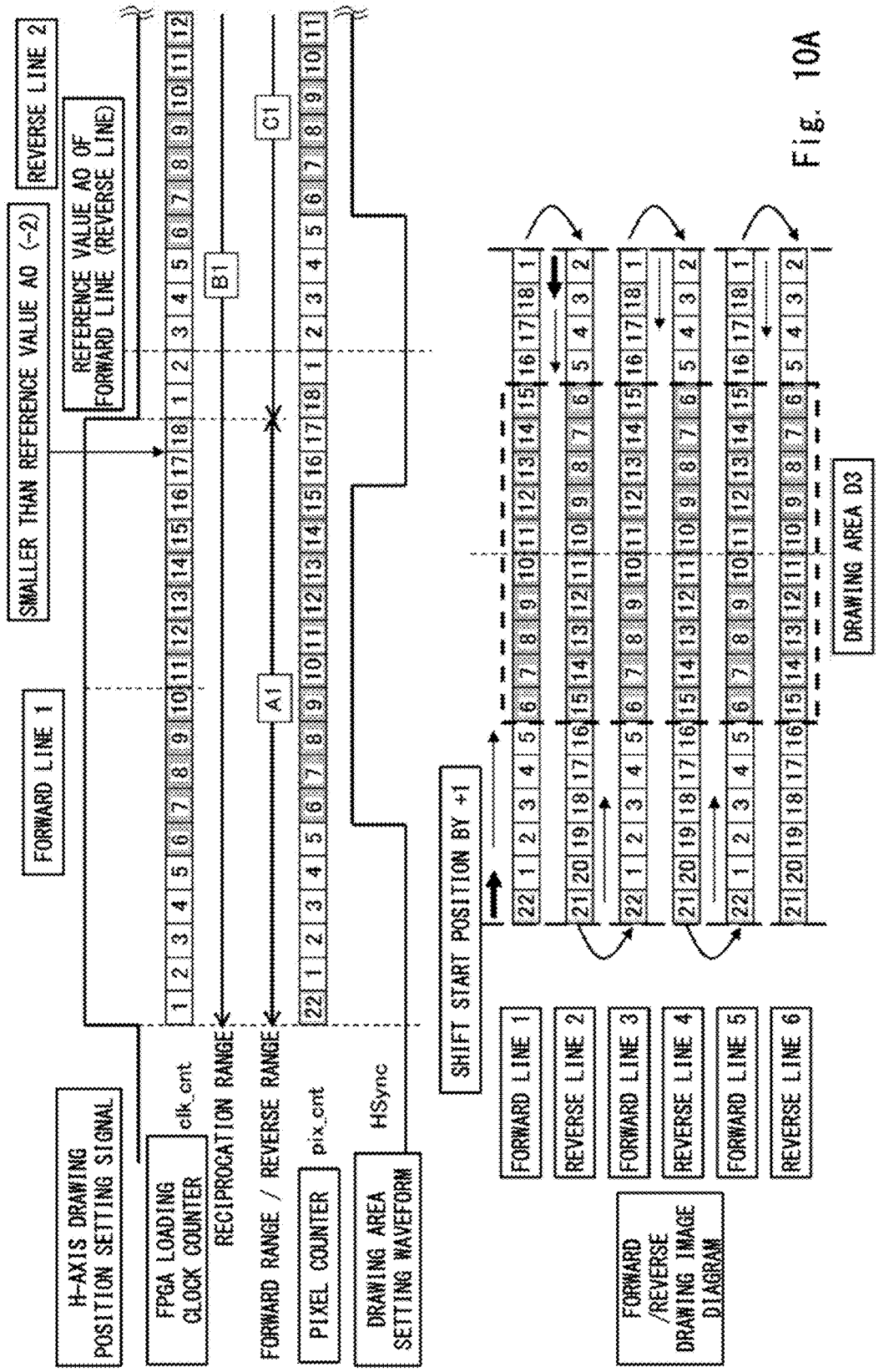
FIG. 10A is an explanatory diagram for explaining an operation example 1 according to the first embodiment.
Figure 10B:
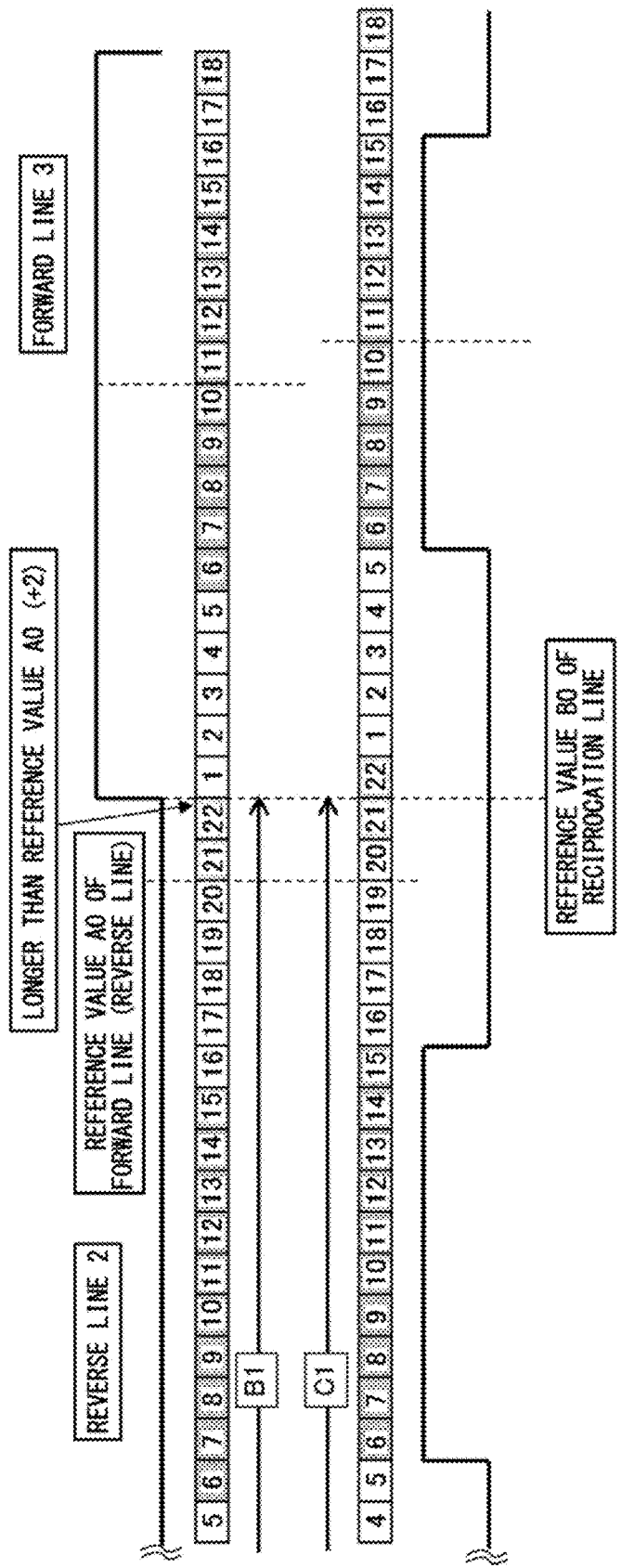
FIG. 10B is an explanatory diagram for explaining the operation example 1 according to the first embodiment.

FIGS. 10A and 10B show an operation example 1 to which this embodiment is applied for the same detection signal as that in FIGS. 9A and 9B. FIGS. 10A and 10B show the operation in the configuration according to this embodiment explained above with reference to FIGS. 1 to 6.

In FIGS. 10A and 10B, the waveform of the frequency (edge interval) of the H-axis drawing position setting signal is not constant but instead varies as in the case of FIGS. 9A and 9B. When the edge intervals of the H-axis drawing position setting signal are counted in synchronization with the internal clock, the counter value of the clock counter (clk_cnt) varies in each edge interval.

Accordingly, in this embodiment, the predetermined reference value is set previously for the ideal detection waveform obtained from the MEMS mirror. Then, when the counter value deviates from the reference value, the counter value is corrected to the reference value according to the correction value calculated by the formula. Therefore, the basis in each line is kept, so deviation in the drawing is reduced. The counter value (the number of counts) which corresponds to that when no deviation occurs in the image such as <ideal case> is set as the reference value at initialization. The set forward range or the reverse range AO and the set reciprocation range BO are stored. Here, as described above, they are stored as follows: the forward or reverse range A0 is 20 and the reciprocation range B0 is 40.

The clock for counting the H-axis drawing position setting signal from the counter value=1 is referred to as a clock counter (clk_cnt), and the clock for counting the H-axis drawing position setting signal from the start position set based on the reference value is referred to as a pixel counter (pix_cnt). The following explanation is given with reference to the clock counter and the corrected pixel counter. However, a single counter may be referred to. Note that, as in the above example, it is assumed that the swing of the MEMS mirrors on the left side is equal to the swing on the right side, and the drawing area is set such that half of the total counts of the reciprocation range is substantially equal to the number of counts of the forward or reverse line.

In FIG. 10A and 10B, like in FIGS. 9A and 9B, the values (i.e., change values) that are obtained by counting the H-axis drawing position setting signal for the forward or reverse range A0=20 and the reciprocation range B0=40 as the reference values are as follows: the forward range A1=18, the reverse range C1=22, and the reciprocation range B1=40. In this embodiment, a correction value for correcting the start position of the counter is obtained using these values and the following equation (1).

$$\{\text{(the change value of the total number of counts in the reciprocation–the reference value of the total number of counts in the reciprocation)–(the change value of the forward count–the reference value of the forward count)}\}/2 = \{(B1-B0)-(A1-A0)\}/2 = \text{correction value} \quad \text{equation (1)}$$

That is, a correction value is obtained by subtracting the difference between a value obtained by counting the forward line and the reference value from the difference between a value obtained by counting the reciprocation range and the reference value and then dividing the value obtained by subtraction by two. Alternatively, though a correction value in the forward line could differ from that in the reverse line, a correction value may be obtained by subtracting a difference between a value obtained by counting the reverse line, instead of using the forward line, and its reference value from a difference between a value obtained by counting the reciprocation range and its reference value and then dividing the value obtained by the subtraction by two.

In this example, refer to the equation (1), the correction value becomes $\{(40-40)-(18-20)\}/2=2/2=1$. Accordingly, in the operation example 1 according to this embodiment, the start position of the counter is shifted by one (+1). As in FIGS. 10A and 10B, if only the forward line (reverse line) is taken into account, the counter is deviated by two from the reference value. However, when the counting start position of the forward line is shifted by one, the counting start position of the reverse line is also shifted by one. Therefore, as understood from FIGS. 10A and 10B, even if the counter is deviated by two, it is possible to correct the deviation of the counter because the actual correction value is obtained by dividing the deviation from the reference value by two.

Since the correction value is one (+1), as shown in FIGS. 10A and 10B, the pixel counter performs counting by shifting the start position of the clock counter in the forward line by one clock in the positive direction in the time axis. In other words, the counter is delayed by one clock. The reciprocation range corresponds to 40 counts and the forward or reverse range corresponds to 20 counts. Accordingly, when the corrected pixel counter is used, the forward line corresponds to the counter value=22, 1, , 18, and 1, and the reverse line corresponds to the counter value =2, 3, . . . , 20, and 21. Thus, the drawing position of the forward line is shifted by one clock to the right, and the drawing position of the reverse line is shifted by one clock to the left. As a result, the positions in the vertical direction of the counter values 6 to 15 in the forward line are the same as the positions in the vertical direction of the counter values 6 to 15 in the reverse line.

Through this control, the HSync for setting the drawing area has a waveform in which the signal repeatedly rises at the timing corresponding to the corrected counter value 6 and falls at the timing corresponding to the corrected counter value 15 in each of the forward and reverse lines in which the edge interval (the number of counts) varies.

As a result, the drawing area for the projected image 300 which is drawn by a repetition of the forward line and the reverse line corresponds to an ideal rectangular region as indicated by D3. Referring to FIGS. 10A and 10B, the counter is controlled based on the difference between the reference value and the edge interval of the H-axis drawing position setting signal, so that the distance from the drawing area in the preceding line to both ends thereof can be made equal to the distance from both ends of the next line to the drawing area. That is, in this embodiment, the count value is controlled based on the reference counter value and the count value obtained from the detection pulse signal of the MEMS mirror so that the drawing areas match each other in each longitudinal line, thereby making it possible to keep the drawing area range constant and eliminate a deviation in each longitudinal line.

Reference Example 2

Next, referring to FIGS. 11A and 11B, another example when the detection signal is varied in the reference example 2 to which this embodiment is not applied will be described.

Figure 11A:
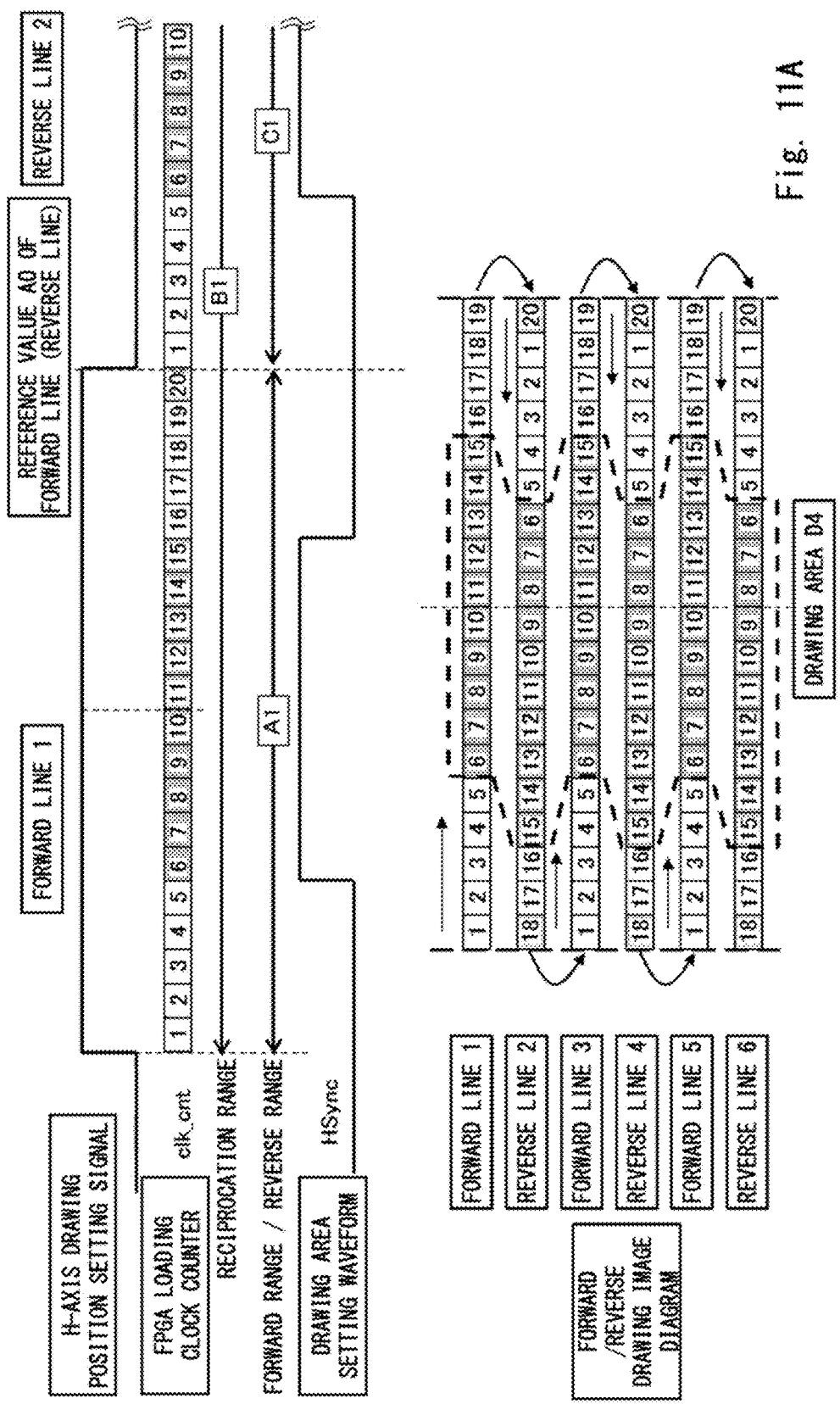
FIG. 11A is an explanatory diagram for explaining an operation according to a reference example 2.
Figure 11B:
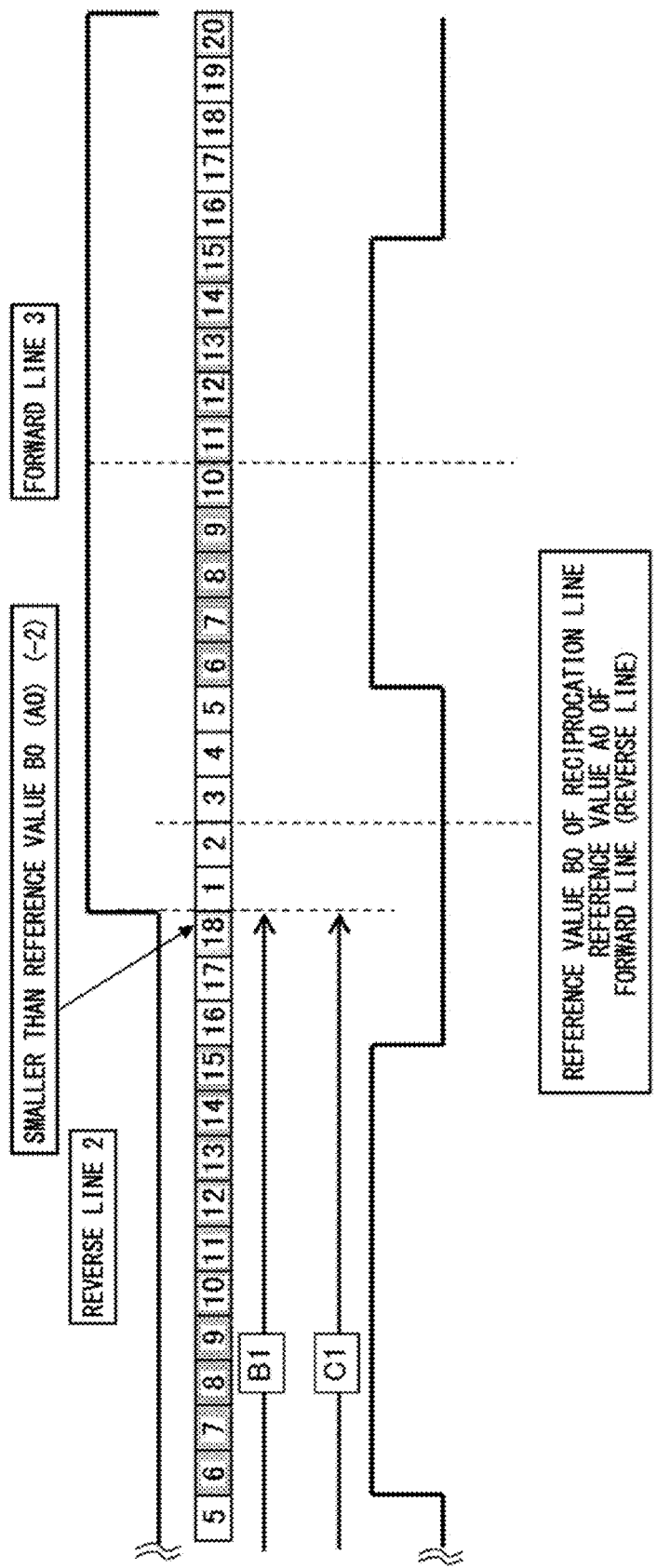
FIG. 11B is an explanatory diagram for explaining the operation according to the reference example 2.

For example, FIGS. 11A and 11B show an example according to configurations similar to those of FIGS. 1 to 3 and 5.

The reference example 2 is an example in which: the forward range is equal to the reference value; the reverse range is smaller than the reference value; and the reciprocation range is smaller than the reference value. That is, the counter values (the number of counts) for these operation ranges are as follows: the forward range A1 is 20 which is equal to the reference value A0=20; the reverse range C1 is 18 which is smaller than the reference value A0=20 by 2; and the reciprocation range B1 is 38 which is smaller than the reference value B0=40 by 2.

As in above example, even if the detection waveform varies, the condition is that the swing of the MEMS mirrors on the left side is equal to the swing on the right side. Accordingly, drawing by turning back as the forward or reverse line corresponds to 19 counts which is half of 38 counts of the reciprocation range, the area between count values 6 to 15 corresponds to the drawing area. Then, the forward line corresponds to the counter values=1, 2, . . . , 18, and 19, and the reverse line corresponds to the counter values=20, 1, 2, . . . , 17 and 18. Thus, the positions corresponding to the counter values 6 to 15 in the forward line are deviated by two counts (2 clocks) from the positions corresponding to the counter values 6 to 15 in the reverse line, so the deviation of the drawing area occurs. That is, as shown in FIG. 11A, the drawing area for the projected image 300 which is drawn by the repetition of the forward line and the reverse line corresponds to an area D4, a deviation occurs in each line in the drawing area D4.

Operation Example 2 According to this Embodiment

Figure 12A:
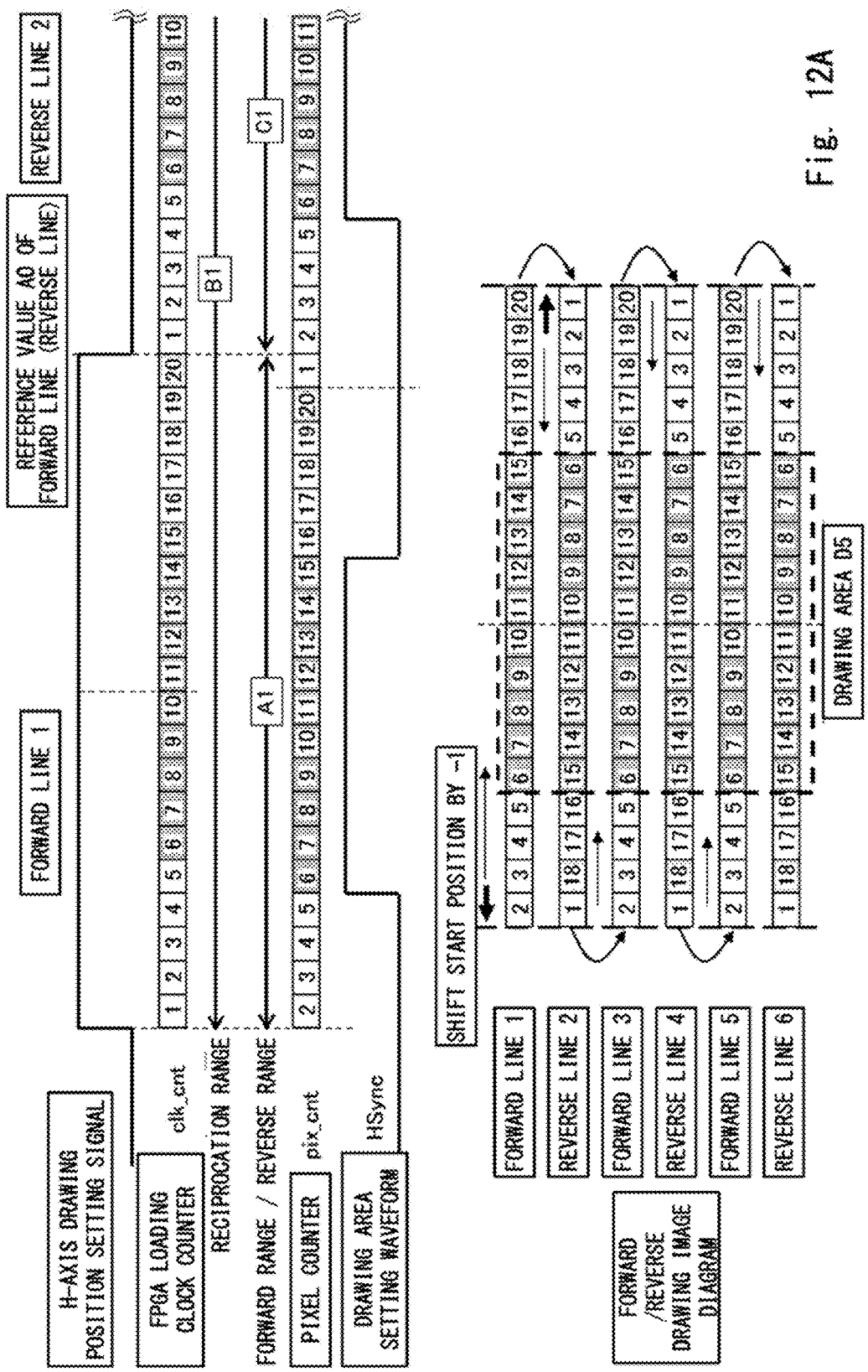
FIG. 12A is an explanatory diagram for explaining an operation example 2 according to the first embodiment.
Figure 12B:
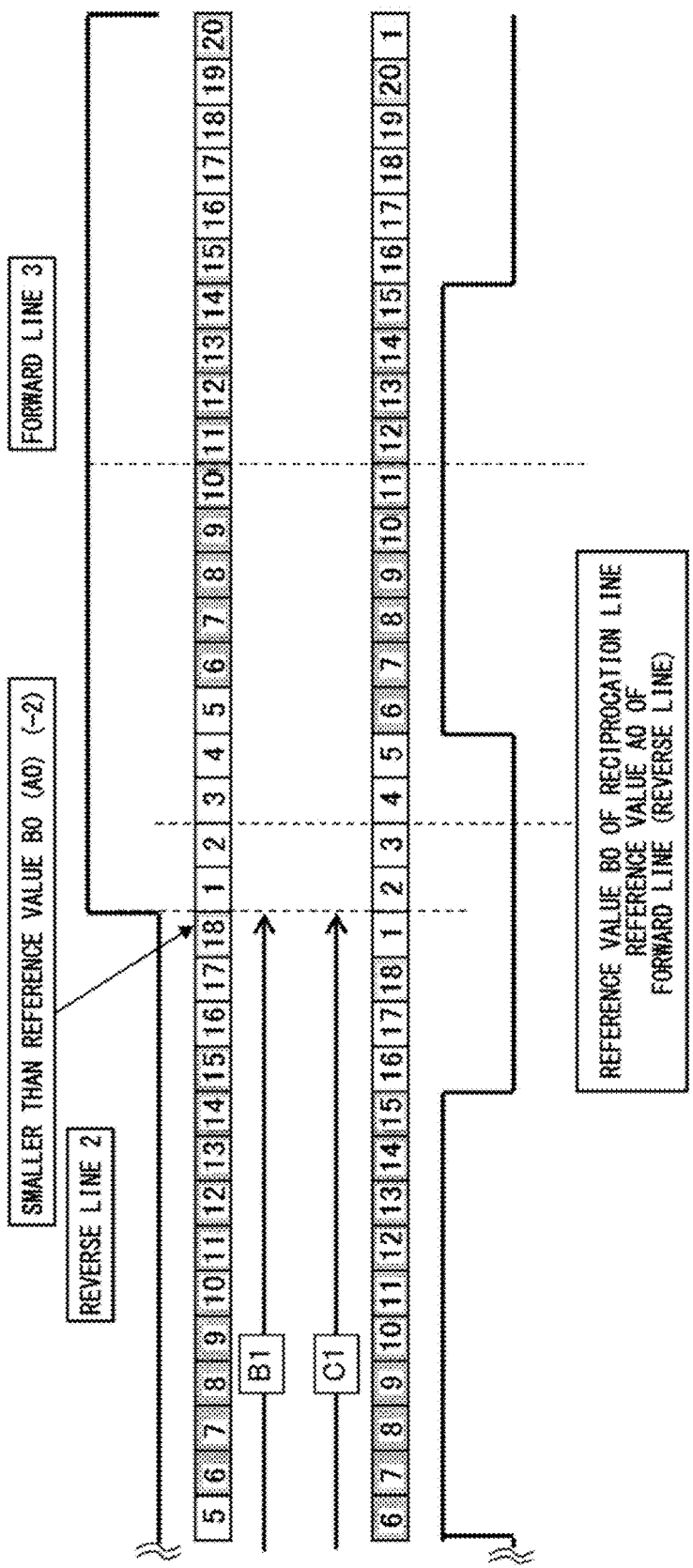
FIG. 12B is an explanatory diagram for explaining the operation example 2 according to the first embodiment.

Next, referring to FIGS. 12A and 12B, an operation example 2 to which this embodiment is applied for the same detection signal as that in FIGS. 11A and 11B will be described. FIGS. 12A and 12B show the operation in the configuration according to this embodiment explained above with reference to FIGS. 1 to 6.

In FIG. 12A and 12B, like in FIGS. 11A and 11B, the values that are obtained by counting the H-axis drawing position setting signal for the forward or reverse range A0=20 and the reciprocation range B0=40 as the reference values are as follows: the forward range A1=20, the reverse range C1=18, and the reciprocation range B1=38. Substituting these values in the above equation (1), the correction value is obtained. So, the correction value becomes {(38−40)−(20−20)}/2=−2/2=−1. Accordingly, in the operation example 2 according to this embodiment, the start position of the counter is shifted by minus one (−1).

Since the correction value is minus one (−1), as shown in FIGS. 12A and 12B, the pixel counter performs counting by shifting the start position of the clock counter in the forward line by one clock in the negative direction in the time axis. In other words, the counter is pushed forward by one clock. The reciprocation range corresponds to 38 counts and the forward or reverse range corresponds to 19 counts. Accordingly, when the corrected pixel counter is used, the forward line corresponds to the counter value =2, 3, . . . , 19, and 20, and the reverse line corresponds to the counter value=1, 2, . . . , 17, 18, and 1. Thus, the drawing position of the forward line is shifted by one clock to the left, and the drawing position of the reverse line is shifted by one clock to the right. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D5.

Reference Example 3

Figure 13A:
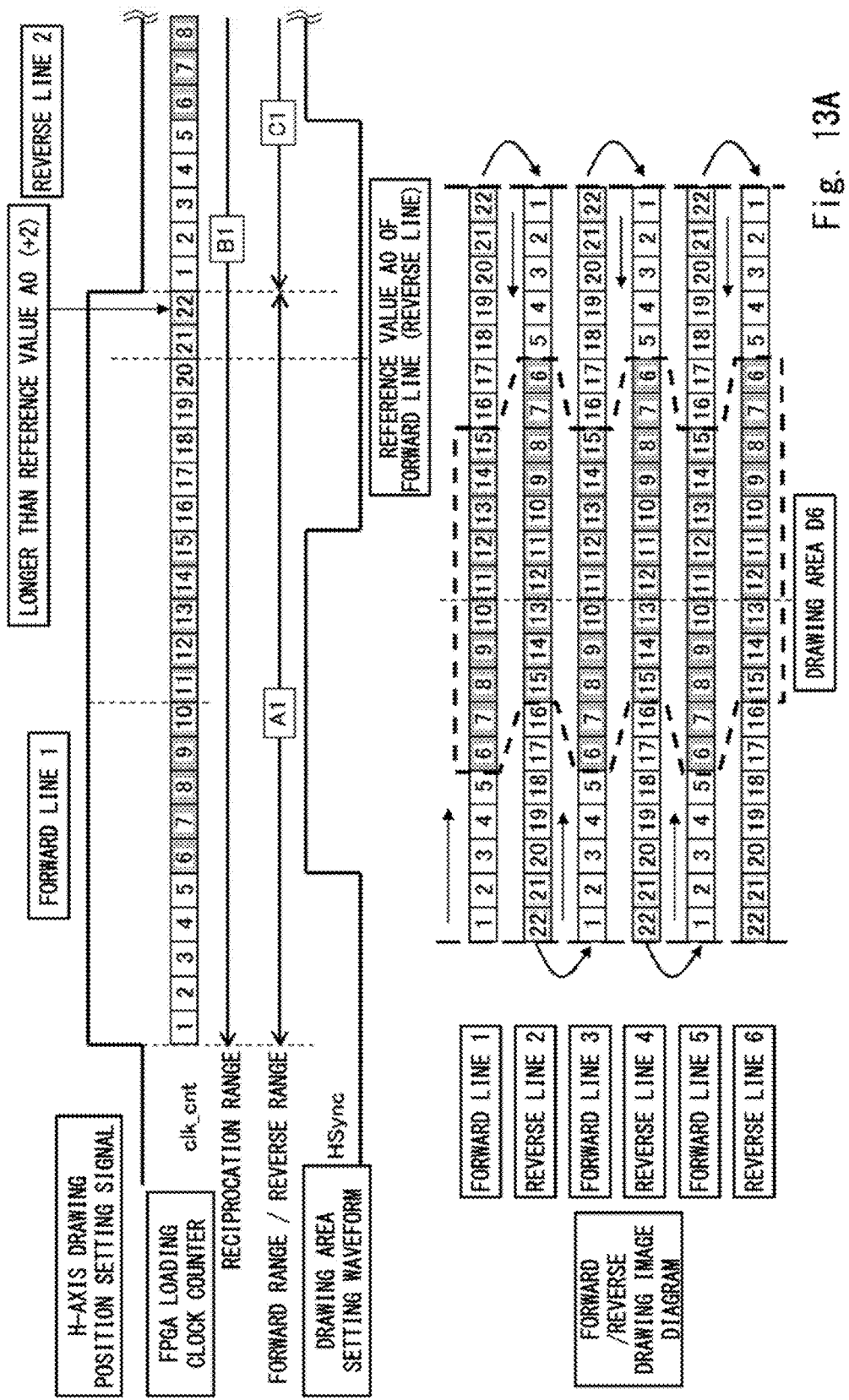
FIG. 13A is an explanatory diagram for explaining an operation according to a reference example 3.
Figure 13B:
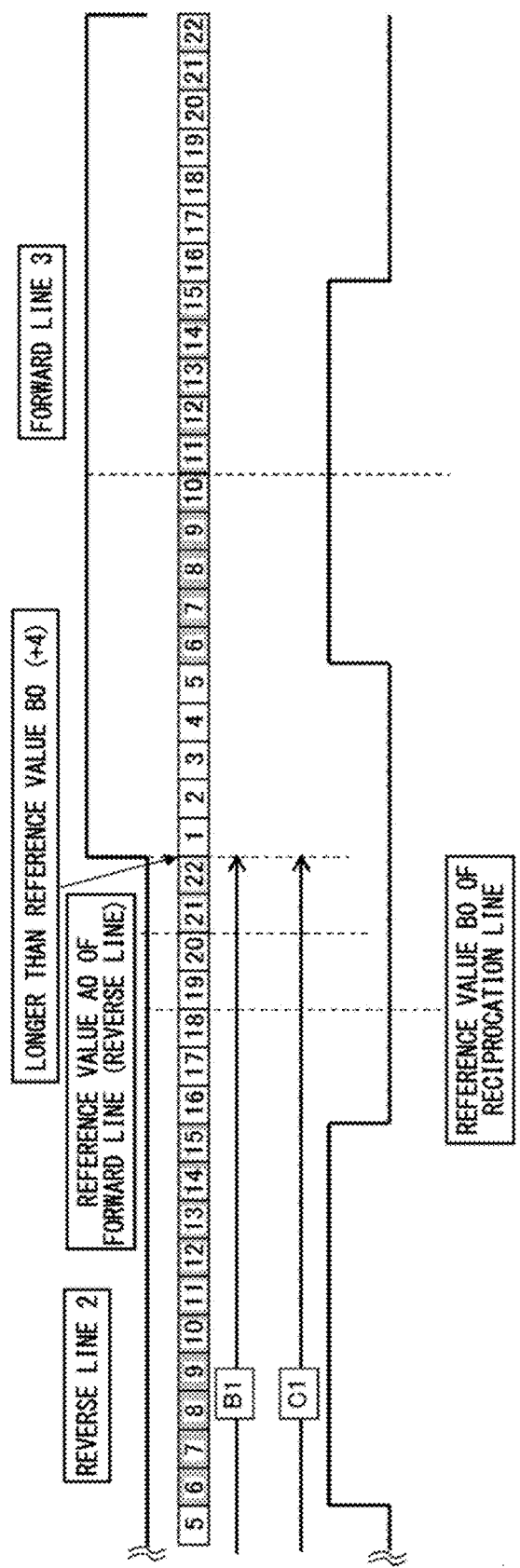
FIG. 13B is an explanatory diagram for explaining the operation according to the reference example 3.

Next, referring to FIGS. 13A and 13B, another example when the detection signal is varied in the reference example 3 to which this embodiment is not applied will be described. For example, FIGS. 13A and 13B show an example according to configurations similar to those of FIGS. 1 to 3 and 5.

The reference example 3 is an example in which: the forward range and the reverse range are larger than the reference value respectively; and the reciprocation range is also larger than the reference value. That is, the counter values (the number of counts) for these operation ranges are as follows: the forward range A1 is 22 which is larger than the reference value A0=20 by 2; the reverse range C1 is 22 which is larger than the reference value A0=20 by 2; and the reciprocation range B1 is 44 which is larger than the reference value B0=40 by 4.

As in above example, even if the detection waveform varies, the condition is that the swing of the MEMS mirrors on the left side is equal to the swing on the right side. Accordingly, drawing by turning back as the forward or reverse line corresponds to 22 counts which is half of 44 counts of the reciprocation range, the area between count values 6 to 15 corresponds to the drawing area. Then, the forward line corresponds to the counter values=1, 2, . . . , 21, and 22, and the reverse line corresponds to the counter values=1, 2, . . . , 21 and 22. Thus, the positions corresponding to the counter values 6 to 15 in the forward line are deviated by two counts (2 clocks) from the positions corresponding to the counter values 6 to 15 in the reverse line, so the deviation of the drawing area occurs. That is, as shown in FIG. 13A, the drawing area for the projected image 300 which is drawn by the repetition of the forward line and the reverse line corresponds to an area D6, a deviation occurs in each line in the drawing area D6.

Operation Example 3 According to this Embodiment

Figure 14A:
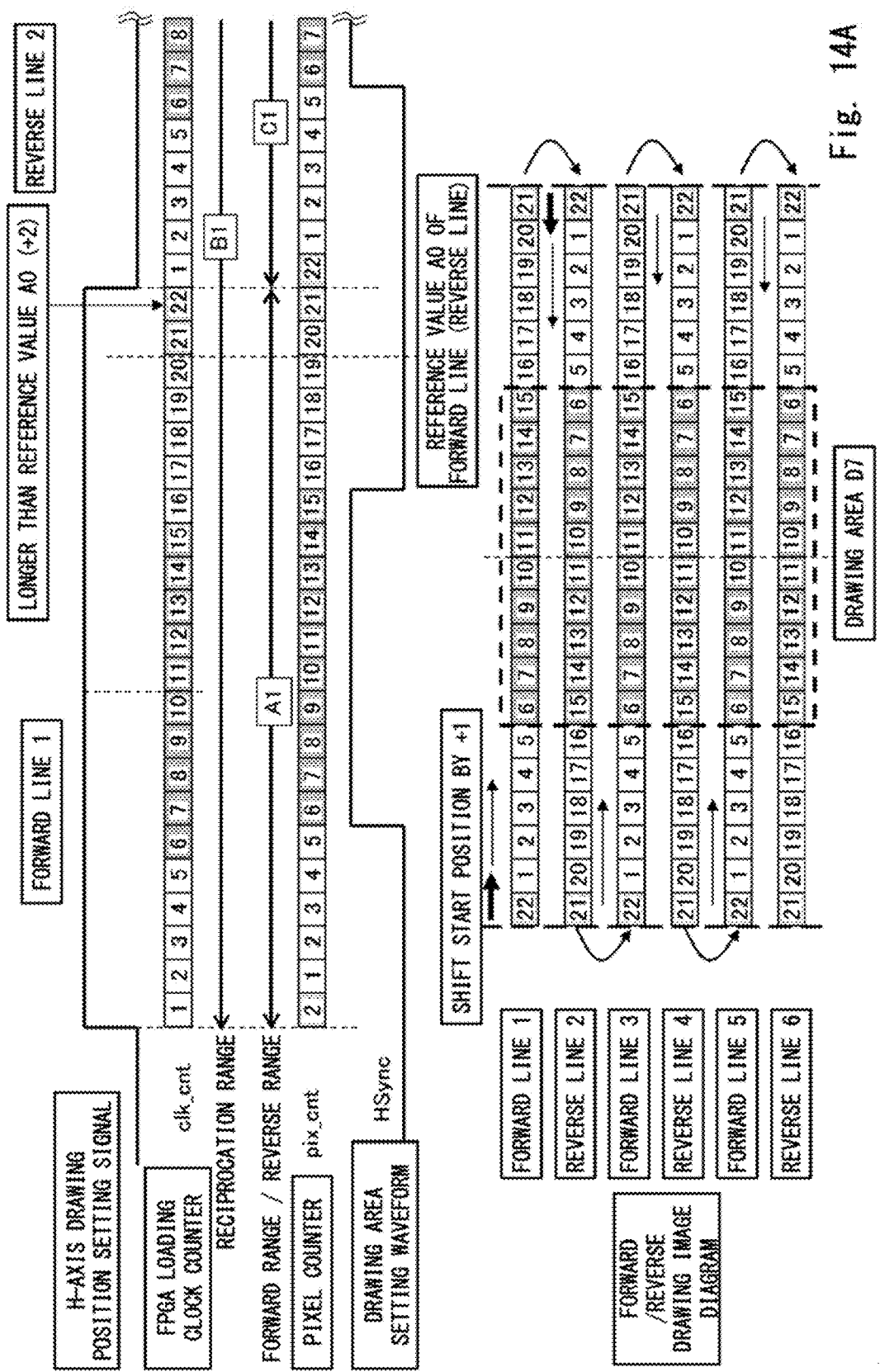
FIG. 14A is an explanatory diagram for explaining an operation example 3 according to the first embodiment.
Figure 14B:
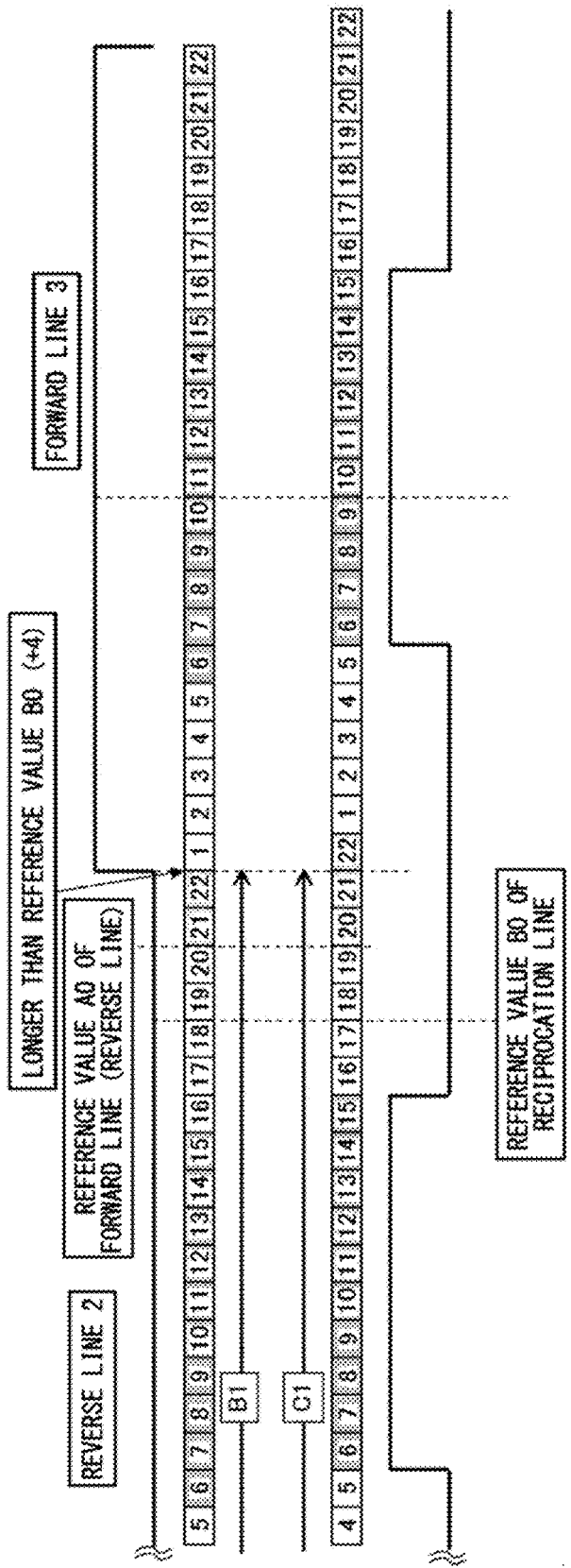
FIG. 14B is an explanatory diagram for explaining the operation example 3 according to the first embodiment.

Next, referring to FIGS. 14A and 14B, an operation example 3 to which this embodiment is applied for the same detection signal as that in FIGS. 13A and 13B will be described. FIGS. 14A and 14B show the operation in the configuration according to this embodiment explained above with reference to FIGS. 1 to 6.

In FIG. 14A and 14B, like in FIGS. 13A and 13B, the values that are obtained by counting the H-axis drawing position setting signal for the forward or reverse range A0=20 and the reciprocation range B0=40 as the reference values are as follows: the forward range A1=22, the reverse range C1=22, and the reciprocation range B1=44. Substituting these values in the above equation (1), the correction value is obtained. So, the correction value becomes {(44−40)−(22−20)}/2=2/2=1. Accordingly, in the operation example 3 according to this embodiment, the start position of the counter is shifted by one (+1).

Since the correction value is one (+1), as shown in FIGS. 14A and 14B, the pixel counter performs counting by shifting the start position of the clock counter in the forward line by one clock in the positive direction in the time axis. In other words, the counter is delayed by one clock. The reciprocation range corresponds to 44 counts and the forward or reverse range corresponds to 22 counts. Accordingly, when the corrected pixel counter is used, the forward line corresponds to the counter value =22, 1, 2, . . . , 20, and 21, and the reverse line corresponds to the counter value =22, 1, 2, . . . , 20 and 21. Thus, the drawing position of the forward line is shifted by one clock to the right, and the drawing position of the reverse line is shifted by one clock to the left. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D7.

Reference Example 4

Figure 15A:
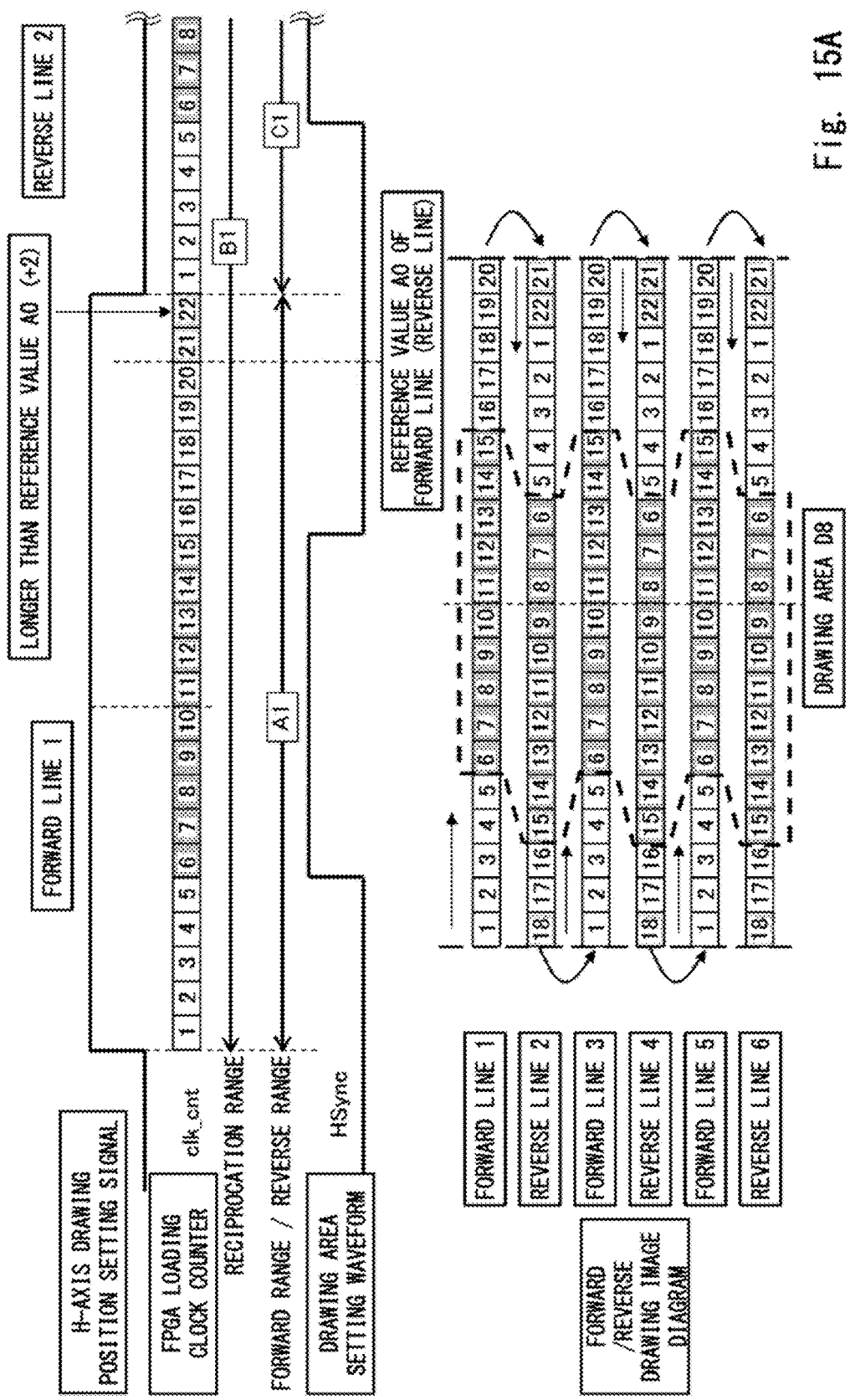
FIG. 15A is an explanatory diagram for explaining an operation according to a reference example 4.
Figure 15B:
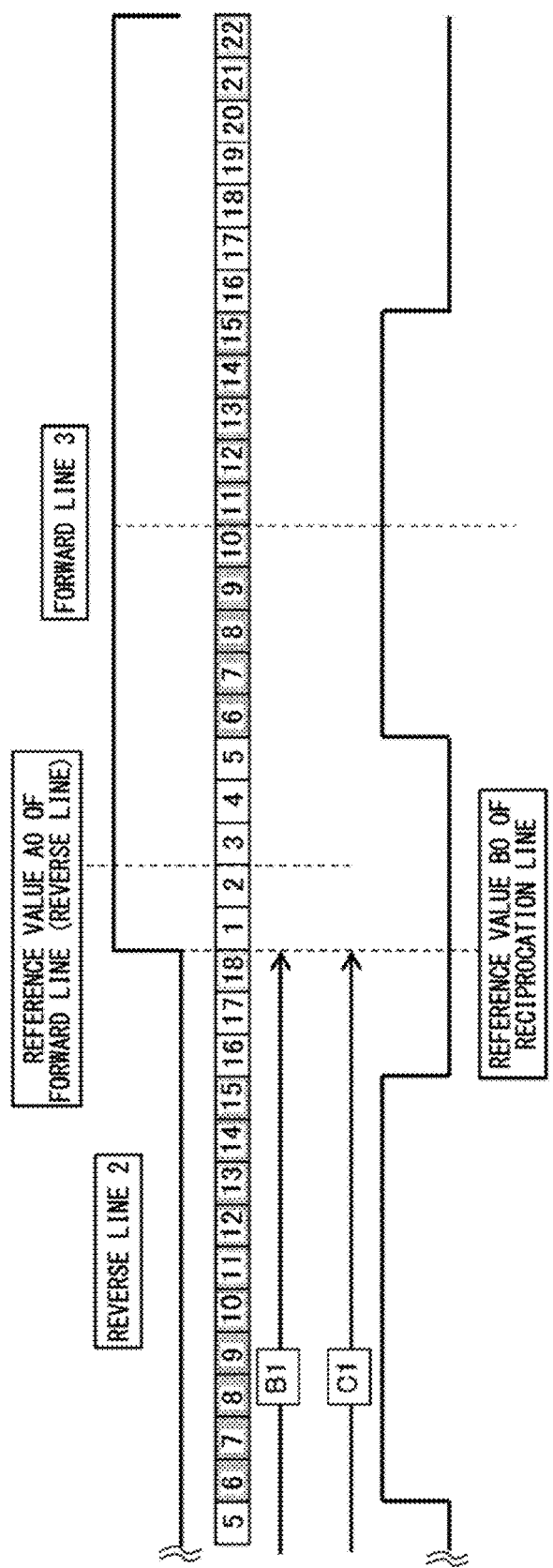
FIG. 15B is an explanatory diagram for explaining the operation according to the reference example 4.

Next, referring to FIGS. 15A and 15B, another example when the detection signal is varied in the reference example 4 to which this embodiment is not applied will be described. For example, FIGS. 15A and 15B show an example according to configurations similar to those of FIGS. 1 to 3 and 5.

The reference example 4 is an example in which: the forward range is larger than the reference value; the reverse range is smaller than the reference value; and the reciprocation range is equal to the reference value. That is, the counter values (the number of counts) for these operation ranges are as follows: the forward range A1 is 22 which is larger than the reference value A0=20 by 2; the reverse range C1 is 18 which is smaller than the reference value A0=20 by 2; and the reciprocation range B1 is 40 which is equal to the reference value B0=40.

As in above example, even if the detection waveform varies, the condition is that the swing of the MEMS mirrors on the left side is equal to the swing on the right side.

Accordingly, drawing by turning back as the forward or reverse line corresponds to 20 counts which is half of 40 counts of the reciprocation range, the area between count values 6 to 15 corresponds to the drawing area. Then, the forward line corresponds to the counter values=1, 2, . . . , 19, and 20, and the reverse line corresponds to the counter values=21, 22, 1, 2, ..., 17 and 18. Thus, the positions corresponding to the counter values 6 to 15 in the forward line are deviated by two counts (2 clocks) from the positions corresponding to the counter values 6 to 15 in the reverse line, so the deviation of the drawing area occurs. That is, as shown in FIG. 15A, the drawing area for the projected image 300 which is drawn by the repetition of the forward line and the reverse line corresponds to an area D8, a deviation occurs in each line in the drawing area D8.

Operation Example 4 According to this Embodiment

Figure 16A:
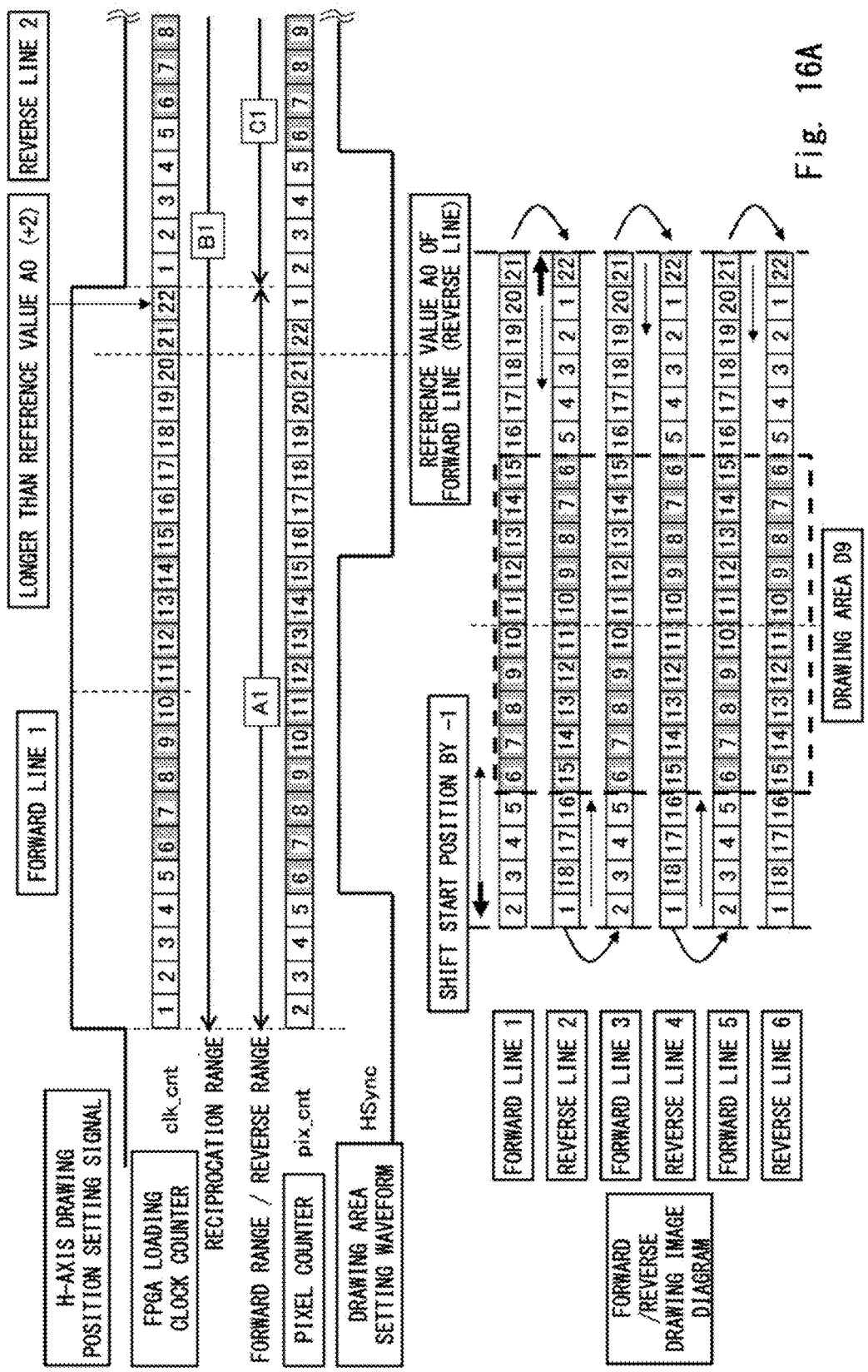
FIG. 16A is an explanatory diagram for explaining an operation example 4 according to the first embodiment.
Figure 16B:
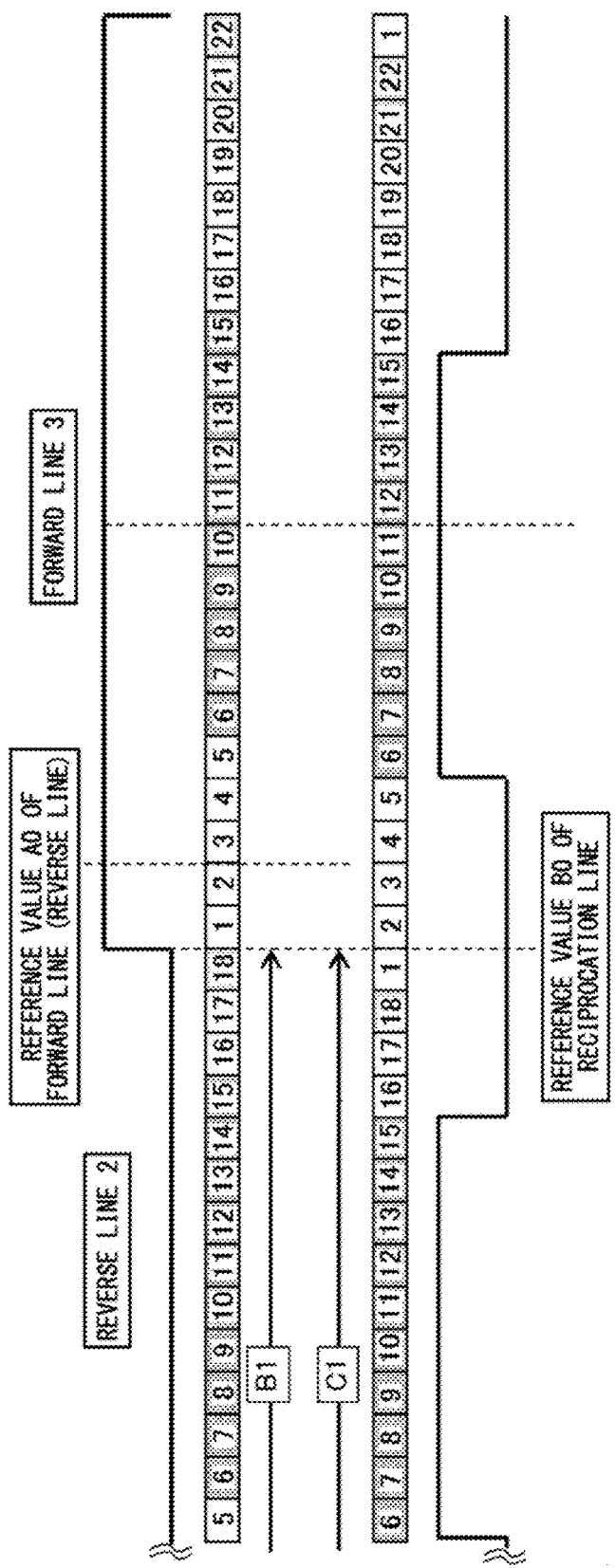
FIG. 16B is an explanatory diagram for explaining the operation example 4 according to the first embodiment.

Next, referring to FIGS. 16A and 16B, an operation example 4 to which this embodiment is applied for the same detection signal as that in FIGS. 15A and 15B will be described. FIGS. 16A and 16B show the operation in the configuration according to this embodiment explained above with reference to FIGS. 1 to 6.

In FIG. 16A and 16B, like in FIGS. 15A and 15B, the values that are obtained by counting the H-axis drawing position setting signal for the forward or reverse range A0=20 and the reciprocation range B0=40 as the reference values are as follows: the forward range A1=22, the reverse range C1=18, and the reciprocation range B1=40. Substituting these values in the above equation (1), the correction value is obtained. So, the correction value becomes {(40−40)−(22−20)}/2=−2/2=−1. Accordingly, in the operation example 4 according to this embodiment, the start position of the counter is shifted by minus one (−1). Since the correction value is minus one (−1), as shown in FIGS. 16A and 16B, the pixel counter performs counting by shifting the start position of the clock counter in the forward line by one clock in the negative direction in the time axis. In other words, the counter is pushed forward by one clock. The reciprocation range corresponds to 40 counts and the forward or reverse range corresponds to 20 counts. Accordingly, when the corrected pixel counter is used, the forward line corresponds to the counter value=2, 3, ..., 20, and 21, and the reverse line corresponds to the counter value=22, 1, 2, ..., 17, 18, and 1. Thus, the drawing position of the forward line is shifted by one clock to the left, and the drawing position of the reverse line is shifted by one clock to the right. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D9.

Reference Example 5

Next, referring to FIGS. 17A and 17B, another example when the detection signal is varied in the reference example 5 to which this embodiment is not applied will be described.

Figure 17A:
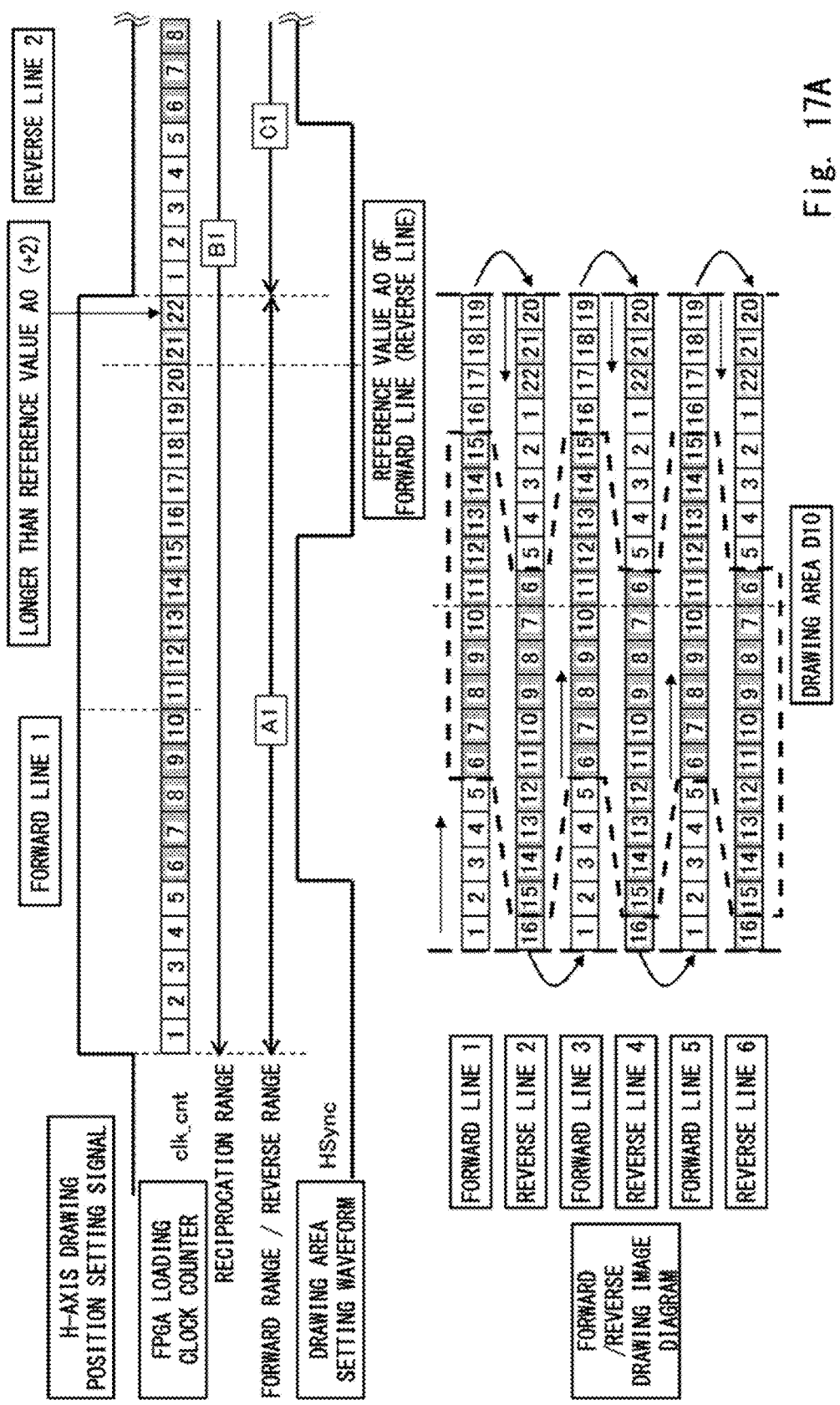
FIG. 17A is an explanatory diagram for explaining an operation according to a reference example 5.
Figure 17B:
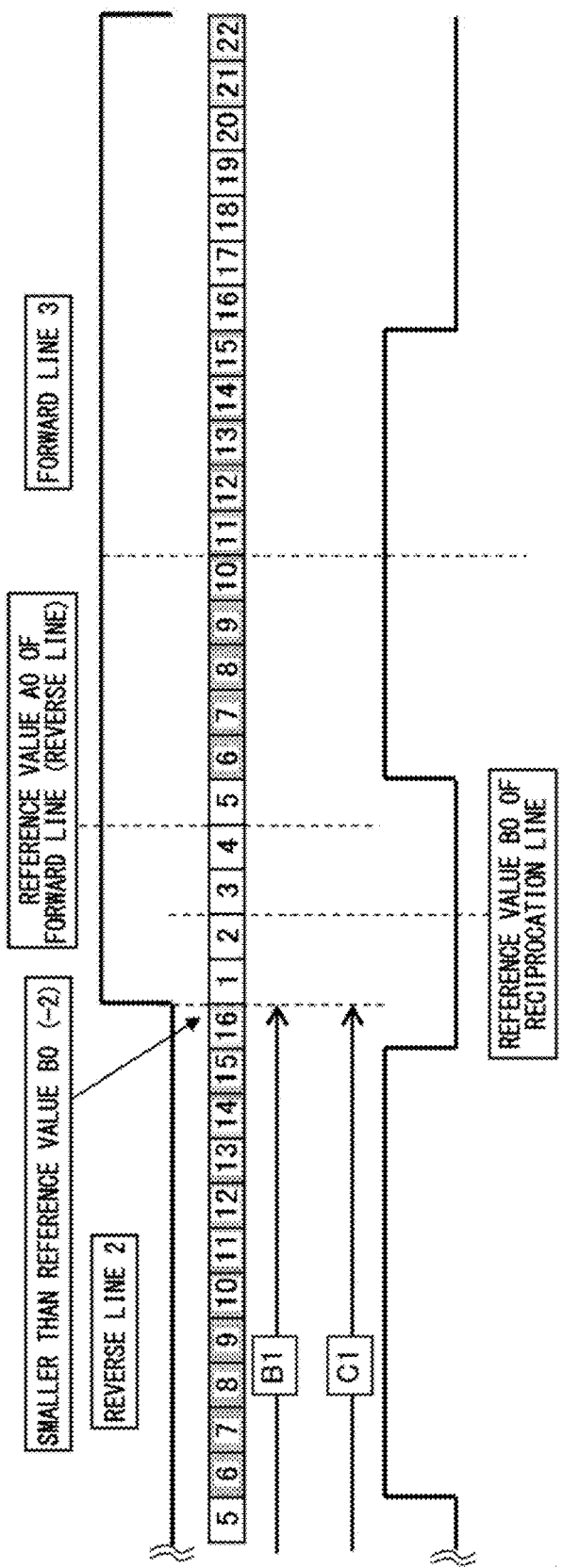
FIG. 17B is an explanatory diagram for explaining the operation according to the reference example 5.

For example, FIGS. 17A and 17B show an example according to configurations similar to those of FIGS. 1 to 3 and 5.

The reference example 5 is an example in which: the forward range is larger than the reference value; the reverse range is smaller than the reference value; and the reciprocation range is smaller than the reference value. That is, the counter values (the number of counts) for these operation ranges are as follows: the forward range A1 is 22 which is larger than the reference value A0=20 by 2; the reverse range C1 is 16 which is smaller than the reference value A0=20 by 4; and the reciprocation range B1 is 38 which is smaller than the reference value B0=40 by 2.

As in above example, even if the detection waveform varies, the condition is that the swing of the MEMS mirrors on the left side is equal to the swing on the right side. Accordingly, drawing by turning back as the forward or reverse line corresponds to 19 counts which is half of 38 counts of the reciprocation range, the area between count values 6 to 15 corresponds to the drawing area. Then, the forward line corresponds to the counter values=1, 2, ..., 18, and 19, and the reverse line corresponds to the counter values=20, 21, 22, 1, 2, ..., 15 and 16. Thus, the positions corresponding to the counter values 6 to 15 in the forward line are deviated by four counts (4 clocks) from the positions corresponding to the counter values 6 to 15 in the reverse line, so the deviation of the drawing area occurs. That is, as shown in FIG. 17A, the drawing area for the projected image 300 which is drawn by the repetition of the forward line and the reverse line corresponds to an area D10, a deviation occurs in each line in the drawing area D10.

Operation Example 5 According to this Embodiment

Figure 18A:
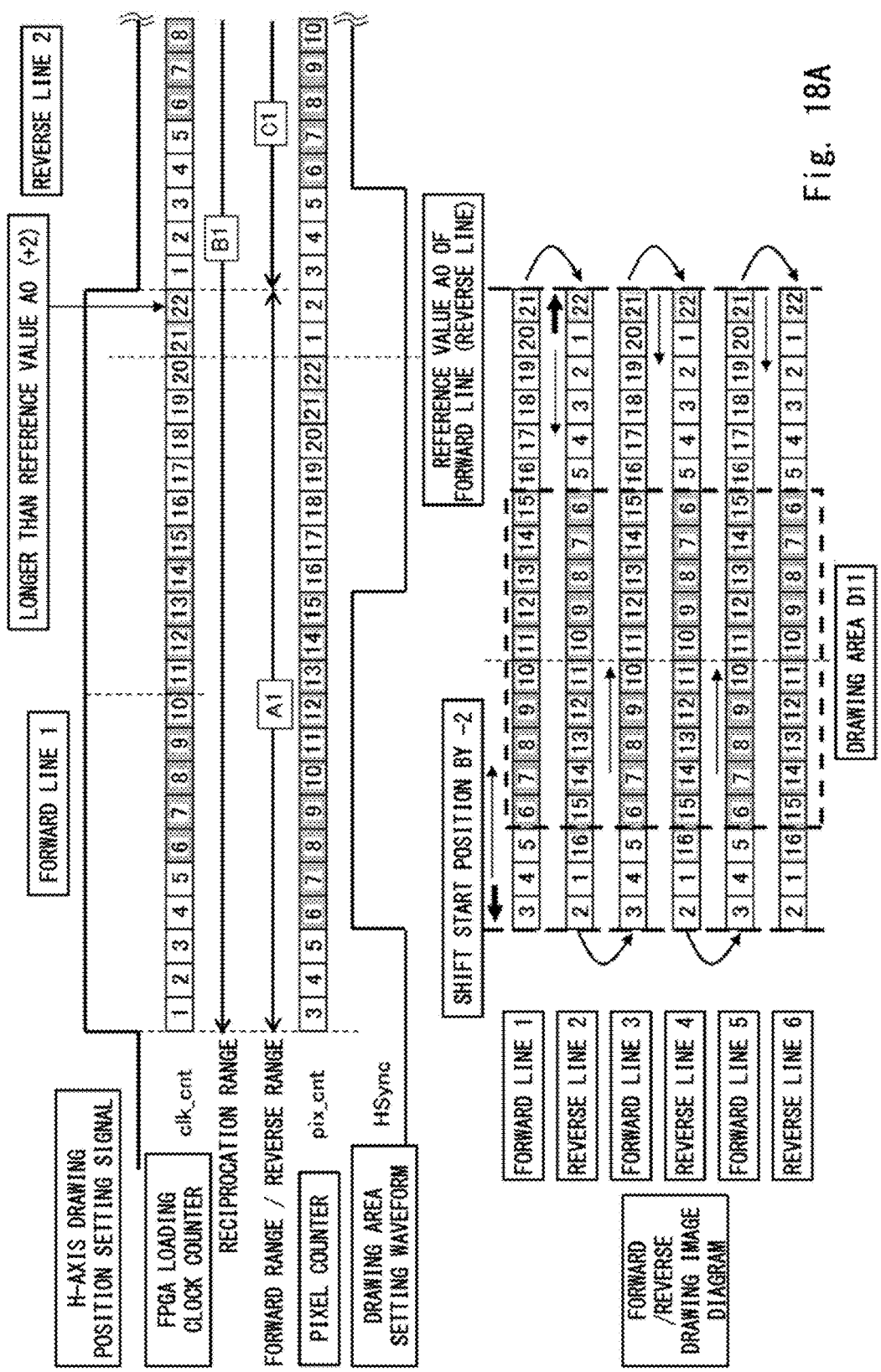
FIG. 18A is an explanatory diagram for explaining an operation example 5 according to the first embodiment.
Figure 18B:
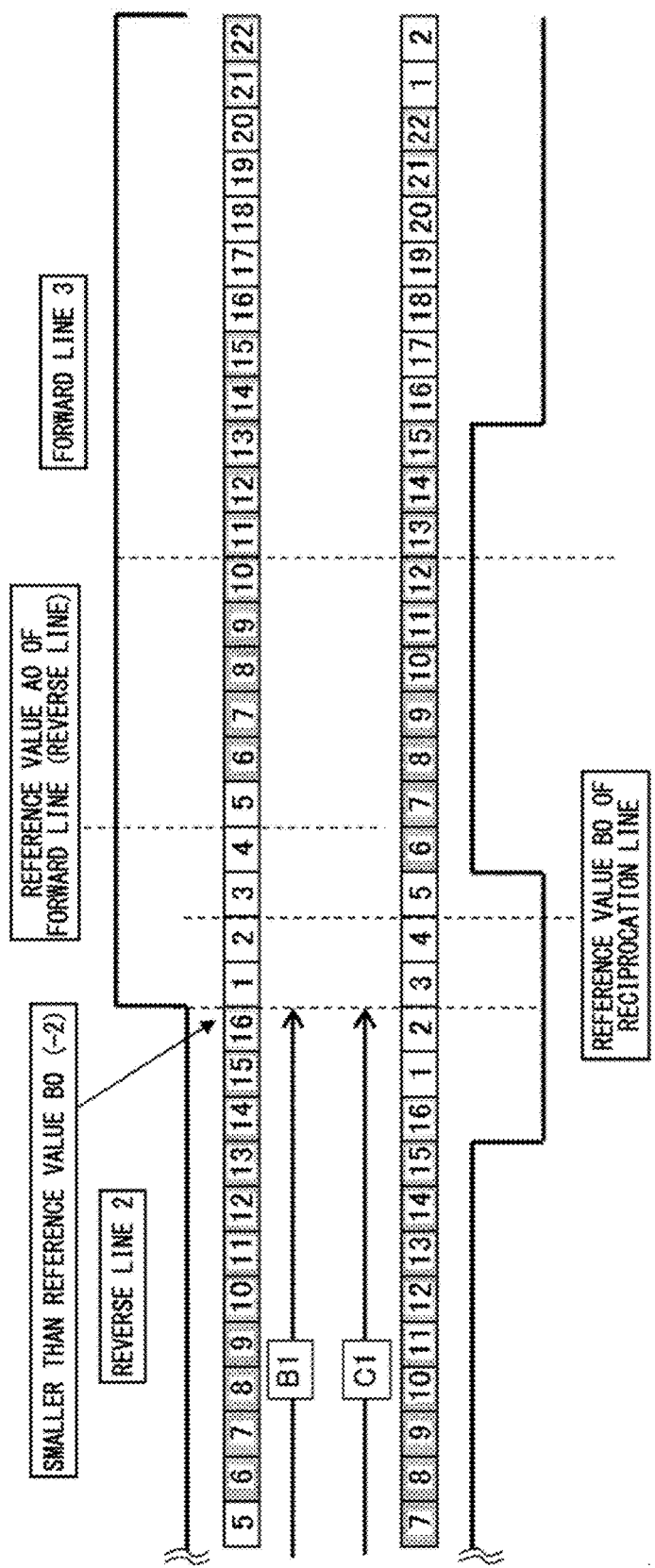
FIG. 18B is an explanatory diagram for explaining the operation example 5 according to the first embodiment.

Next, referring to FIGS. 18A and 18B, an operation example 5 to which this embodiment is applied for the same detection signal as in FIGS. 17A and 17B will be described. FIGS. 18A and 18B show the operation in the configuration according to this embodiment explained above with reference to FIGS. 1 to 6.

In FIG. 18A and 18B, like in FIGS. 17A and 17B, the values that are obtained by counting the H-axis drawing position setting signal for the forward or reverse range A0=20 and the reciprocation range B0=40 as the reference values are as follows: the forward range A1=22, the reverse range C1=16, and the reciprocation range B1=38. Substituting these values in the above equation (1), the correction value is obtained. So, the correction value becomes {(38−40)−(22−20)}/2=−4/2=−2. Accordingly, in the operation example 5 according to this embodiment, the start position of the counter is shifted by minus two (−2).

Since the correction value is minus two (−2), as shown in FIGS. 18A and 18B, the pixel counter performs counting by shifting the start position of the clock counter in the forward line by two clock in the negative direction in the time axis. In other words, the counter is pushed forward by two clock. The reciprocation range corresponds to 38 counts and the forward or reverse range corresponds to 19 counts. Accordingly, when the corrected pixel counter is used, the forward line corresponds to the counter value=3, 4, ..., 20, and 21, and the reverse line corresponds to the counter value=22, 1, 2, ..., 15, 16, 1, and 2. Thus, the drawing position of the forward line is shifted by two clock to the left, and the drawing position of the reverse line is shifted by two clock to the right. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D11.

Reference Example 6

Next, referring to FIGS. 19A and 19B, another example when the detection signal is varied in the reference example 6 to which this embodiment is not applied will be described.

Figure 19A:
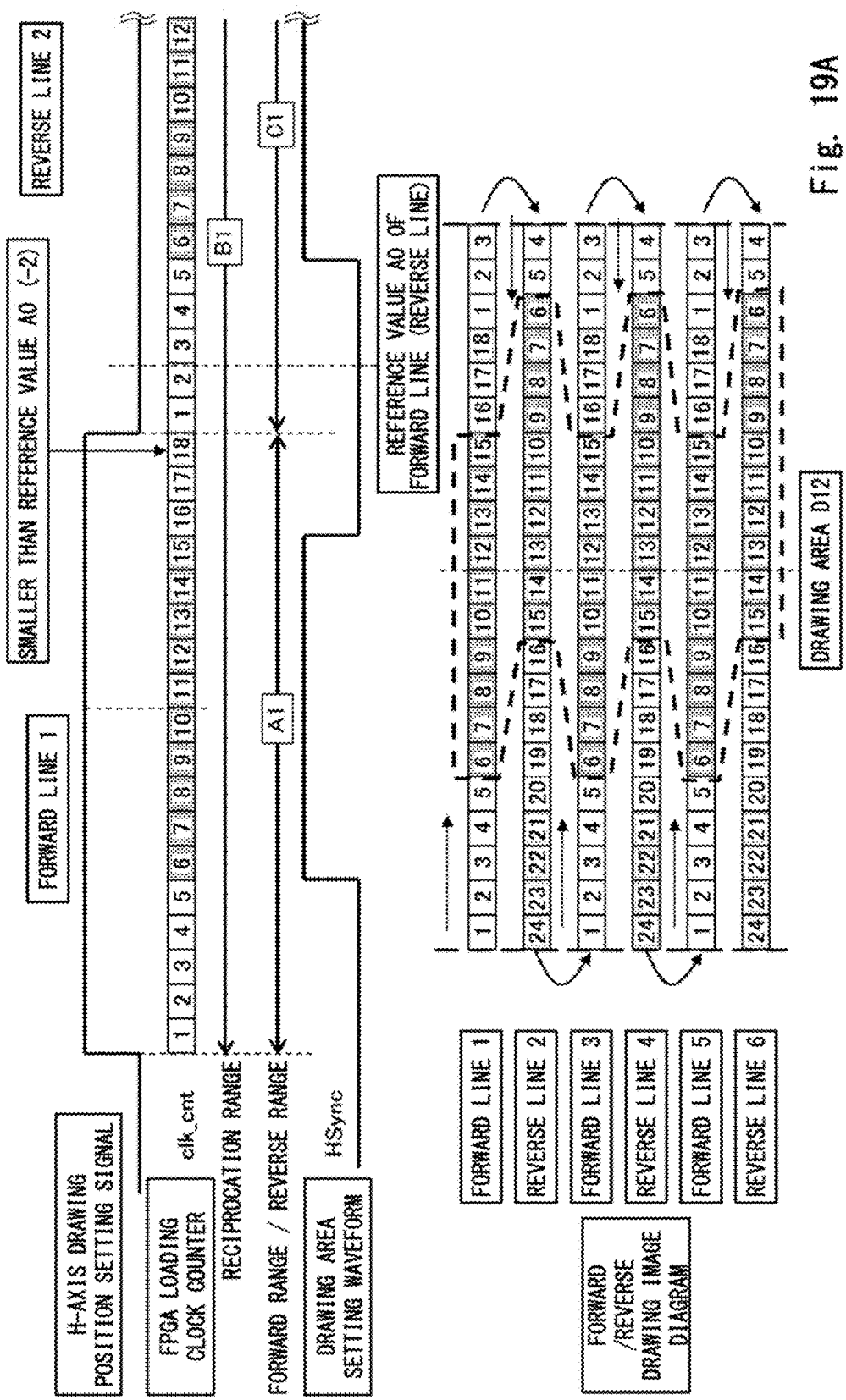
FIG. 19A is an explanatory diagram for explaining an operation according to a reference example 6.
Figure 19B:
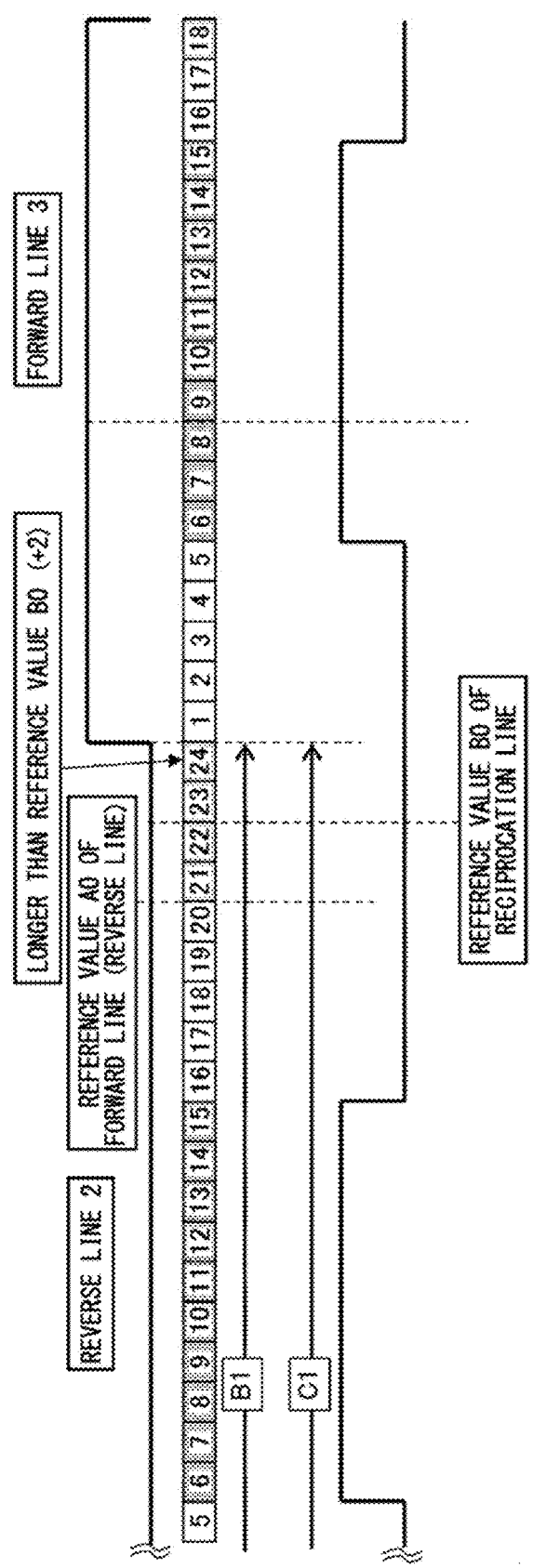
FIG. 19B is an explanatory diagram for explaining the operation according to the reference example 6.

For example, FIGS. 19A and 19B show an example according to configurations similar to those of FIGS. 1 to 3 and 5.

The reference example 6 is an example in which: the forward range is smaller than the reference value; the reverse range is larger than the reference value; and the reciprocation range is larger than the reference value. That is, the counter values (the number of counts) for these operation ranges are as follows: the forward range A1 is 18 which is smaller than the reference value A0=20 by 2; the reverse range C1 is 24 which is larger than the reference value A0=20 by 4; and the reciprocation range B1 is 42 which is larger than the reference value B0=40 by 2.

As in above example, even if the detection waveform varies, the condition is that the swing of the MEMS mirrors on the left side is equal to the swing on the right side. Accordingly, drawing by turning back as the forward or reverse line corresponds to 21 counts which is half of 42 counts of the reciprocation range, the area between count values 6 to 15 corresponds to the drawing area. Then, the forward line corresponds to the counter values=1, 2, ..., 18, 1, 2, and 3, and the reverse line corresponds to the counter values=3, 5, ..., 23 and 24. Thus, the positions corresponding to the counter values 6 to 15 in the forward line are deviated by four counters (4 clocks) from the positions corresponding to the counter values 6 to 15 in the reverse line, so the deviation of the drawing area occurs. That is, as shown in FIG. 19A, the drawing area for the projected image 300 which is drawn by the repetition of the forward line and the reverse line corresponds to an area D12, a deviation occurs in each line in the drawing area D12.

Operation Example 6 According to this Embodiment

Figure 20A:
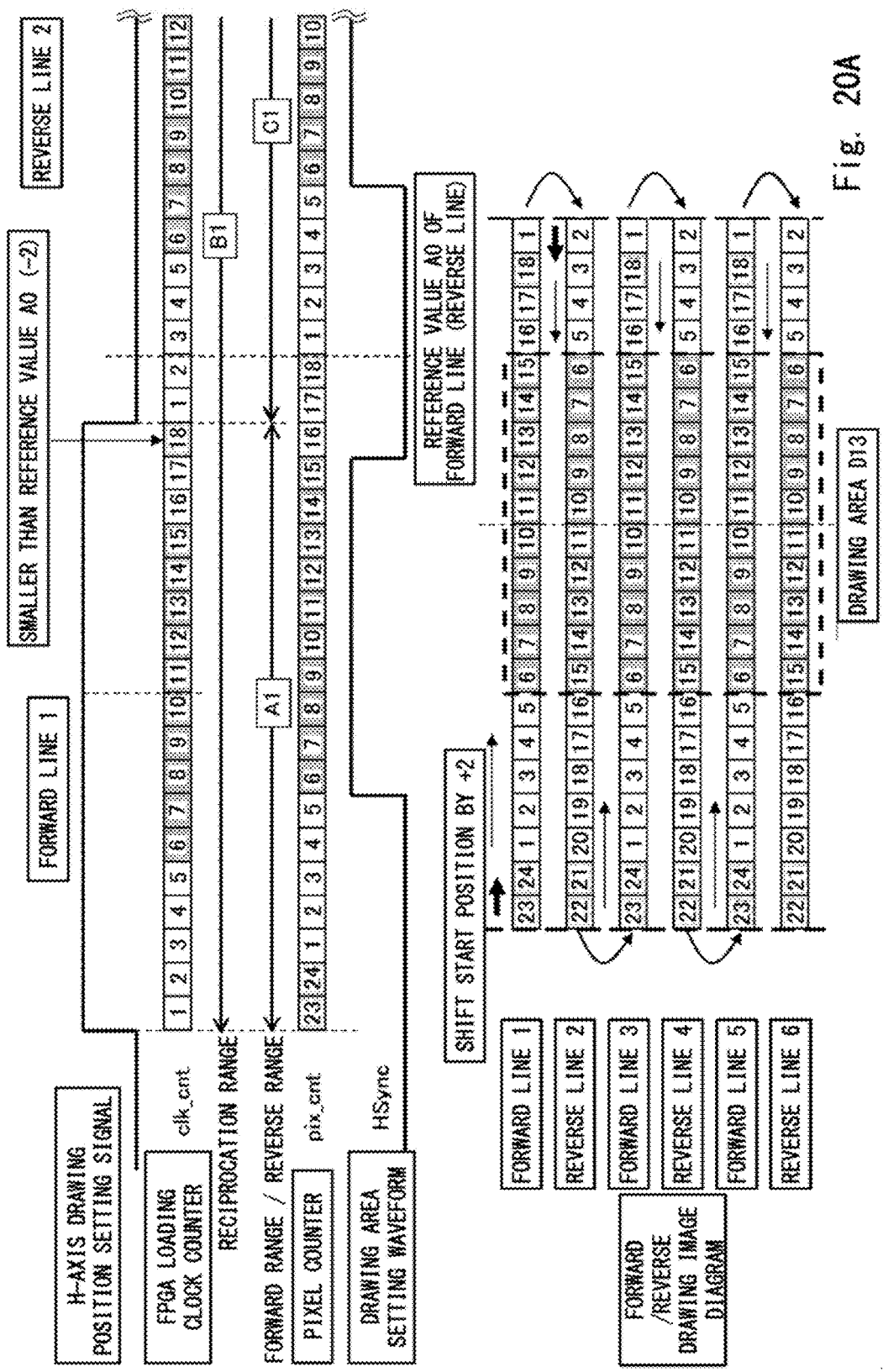
FIG. 20A is an explanatory diagram for explaining an operation example 6 according to the first embodiment.
Figure 20B:
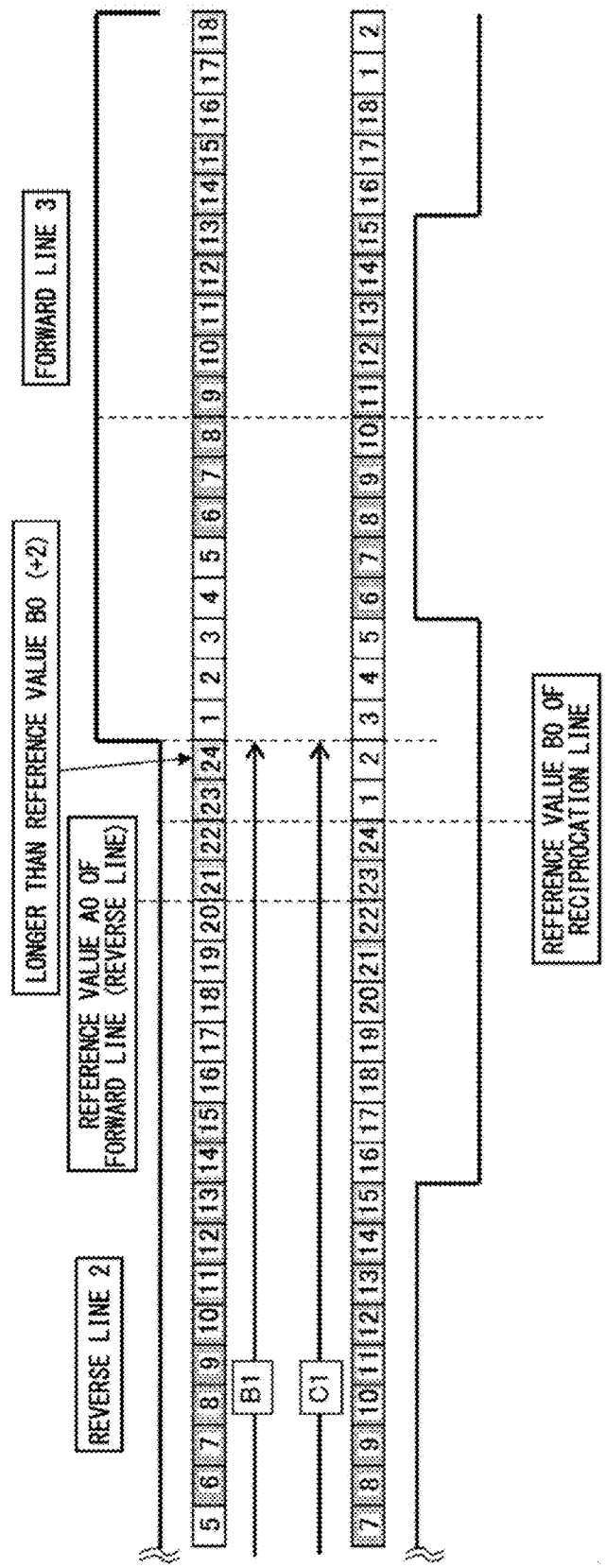
FIG. 20B is an explanatory diagram for explaining the operation example 6 according to the first embodiment.

Next, referring to FIGS. 20A and 20B, an operation example 6 to which this embodiment is applied for the same detection signal as in FIGS. 19A and 19B will be described. FIGS. 20A and 20B show the operation in the configuration according to this embodiment explained above with reference to FIGS. 1 to 6.

In FIG. 20A and 20B, like in FIGS. 19A and 19B, the values that are obtained by counting the H-axis drawing position setting signal for the forward or reverse range A0=20 and the reciprocation range B0=40 as the reference values are as follows: the forward range A1=18, the reverse range C1=24, and the reciprocation range B1=42. Substituting these values in the above equation (1), the correction value is obtained. So, the correction value becomes {(42−40)−(18−20)}/2=4/2=2. Accordingly, in the operation example 6 according to this embodiment, the start position of the counter is shifted by two (+2).

Since the correction value is two (+2), as shown in FIGS. 20A and 20B, the pixel counter performs counting by shifting the start position of the clock counter in the forward line by two clock in the positive direction in the time axis. In other words, the counter is delayed by two clock. The reciprocation range corresponds to 42 counts and the forward or reverse range corresponds to 21 counts. Accordingly, when the corrected pixel counter is used, the forward line corresponds to the counter value =23, 24, 1, 2, ..., 17, 18, and 1, and the reverse line corresponds to the counter value =2, 3, ..., 21 and 22. Thus, the drawing position of the forward line is shifted by two clock to the right, and the drawing position of the reverse line is shifted by two clock to the left. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D13.

Reference Example 7

Figure 21A:
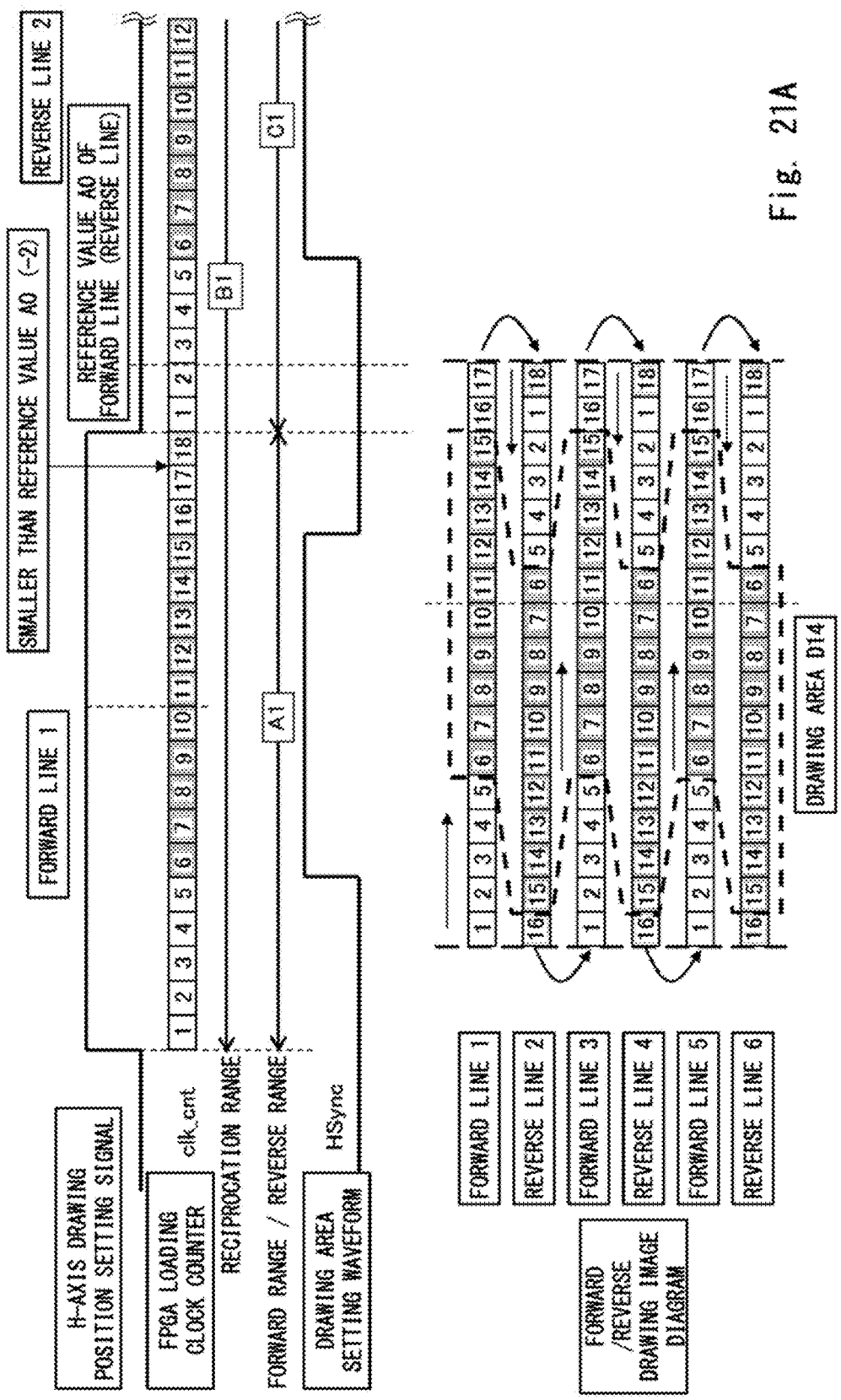
FIG. 21A is an explanatory diagram for explaining an operation according to a reference example 7.
Figure 21B:
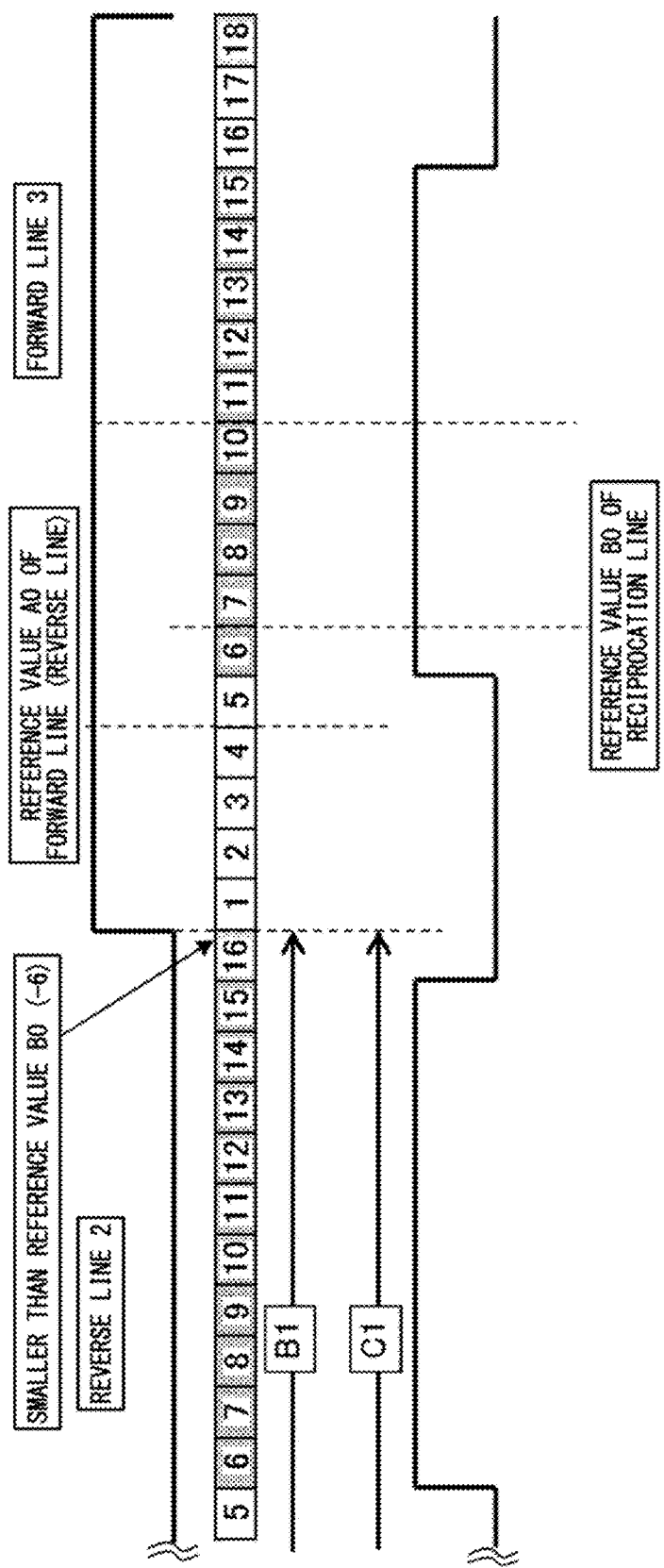
FIG. 21B is an explanatory diagram for explaining the operation according to the reference example 7.

Next, referring to FIGS. 21A and 21B, another example when the detection signal is varied in the reference example 7 to which this embodiment is not applied will be described. For example, FIGS. 21A and 21B show an example according to configurations similar to those of FIGS. 1 to 3 and 5.

The reference example 7 is an example in which: the forward range and the reverse range are smaller than the reference value respectively; and the reciprocation range is also smaller than the reference value. That is, the counter values (the number of counts) for these operation ranges are as follows: the forward range A1 is 18 which is smaller than the reference value A0=20 by 2; the reverse range C1 is 16 which is smaller than the reference value A0=20 by 4; and the reciprocation range B1 is 34 which is smaller than the reference value B0=40 by 6.

As in above example, even if the detection waveform varies, the condition is that the swing of the MEMS mirrors on the left side is equal to the swing on the right side. Accordingly, drawing by turning back as the forward or reverse line corresponds to 17 counts which is half of 34 counts of the reciprocation range, the area between count values 6 to 15 corresponds to the drawing area. Then, the forward line corresponds to the counter values=1, 2, ..., 16, and 17, and the reverse line corresponds to the counter values=18, 1, 2, ..., 15 and 16. Thus, the positions corresponding to the counter values 6 to 15 in the forward line are deviated by four counts (4 clocks) from the positions corresponding to the counter values 6 to 15 in the reverse line, so the deviation of the drawing area occurs. That is, as shown in FIG. 21A, the drawing area for the projected image 300 which is drawn by the repetition of the forward line and the reverse line corresponds to an area D14, a deviation occurs in each line in the drawing area D14.

Operation Example 7 According to this Embodiment

Figure 22A:
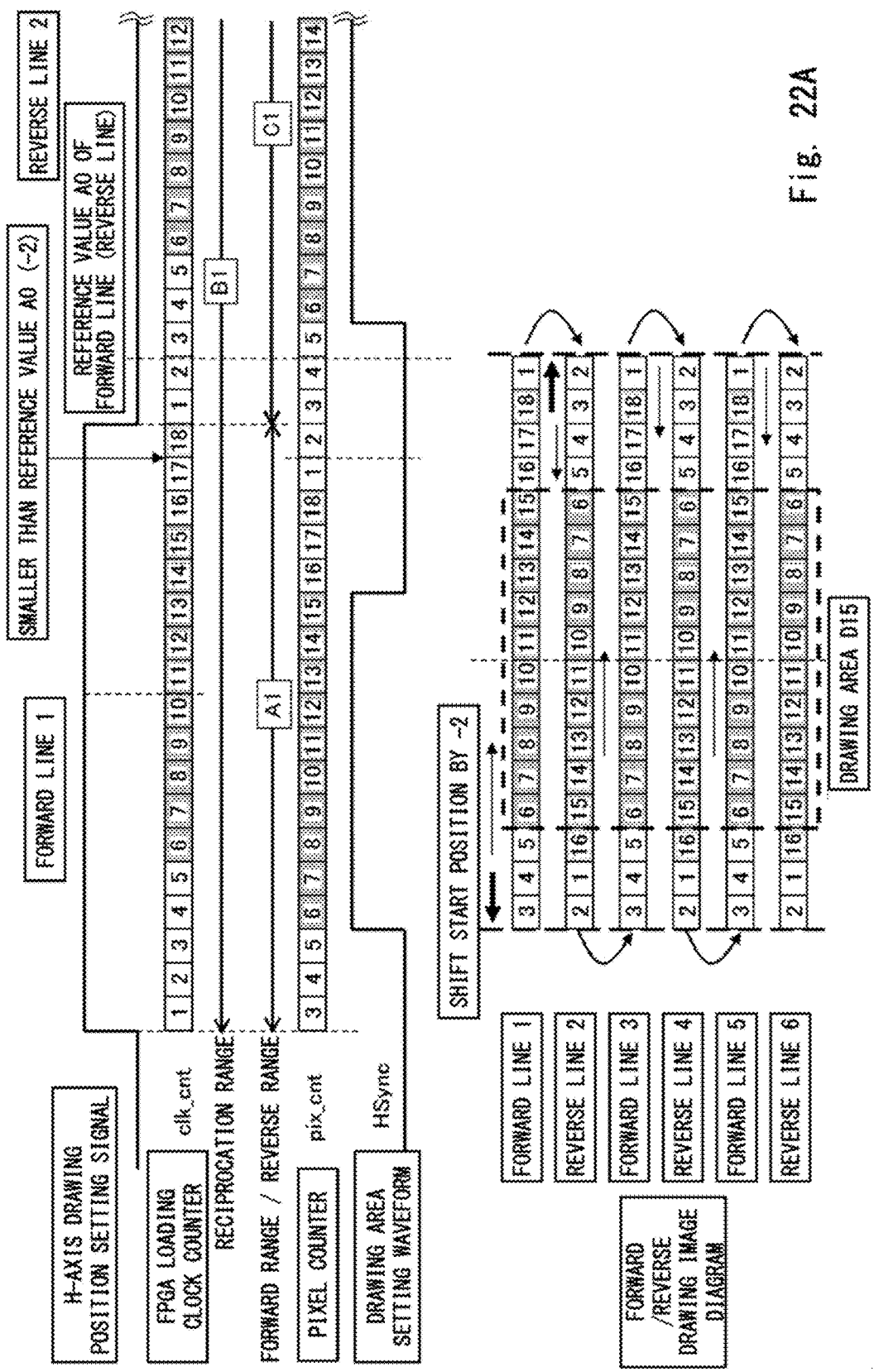
FIG. 22A is an explanatory diagram for explaining an operation example 7 according to the first embodiment.
Figure 22B:
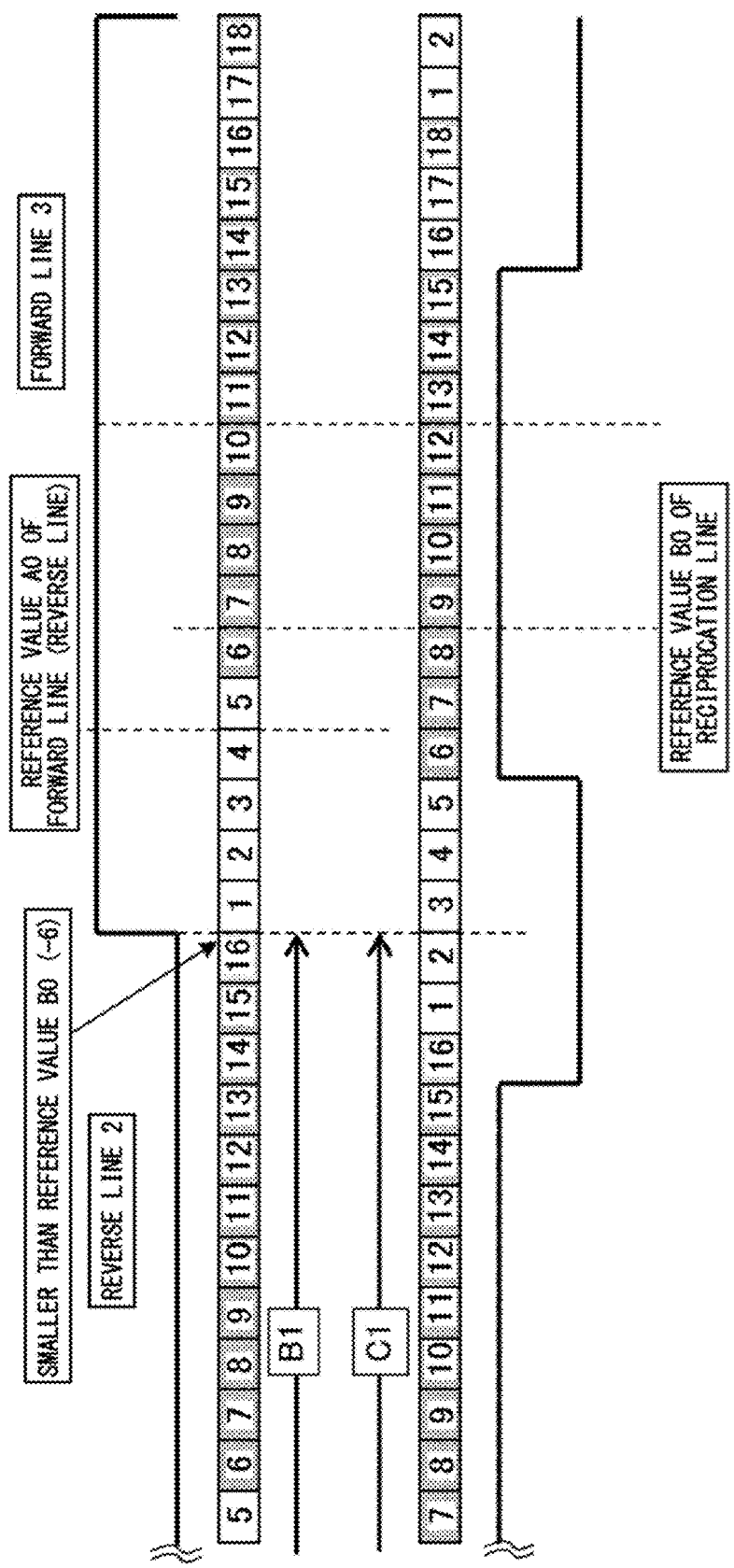
FIG. 22B is an explanatory diagram for explaining the operation example 7 according to the first embodiment.

Next, referring to FIGS. 22A and 22B, an operation example 7 to which this embodiment is applied for the same detection signal as that in FIGS. 21A and 21B will be described. FIGS. 22A and 22B show the operation in the configuration according to this embodiment explained above with reference to FIGS. 1 to 6.

In FIG. 22A and 22B, like in FIGS. 21A and 21B, the values that are obtained by counting the H-axis drawing position setting signal for the forward or reverse range A0=20 and the reciprocation range B0=40 as the reference values are as follows: the forward range A1=18, the reverse range C1=16, and the reciprocation range B1=34. Substituting these values in the above equation (1), the correction value is obtained. So, the correction value becomes {(34−40)−(18−20)}/2=−4/2=−2. Accordingly, in the operation example 7 according to this embodiment, the start position of the counter is shifted by minus two (−2). Since the correction value is minus two (−2), as shown in FIGS. 22A and 22B, the pixel counter performs counting by shifting the start position of the clock counter in the forward line by two clock in the negative direction in the time axis. In other words, the counter is pushed forward by two clock. The reciprocation range corresponds to 34 counts and the forward or reverse range corresponds to 17 counts. Accordingly, when the corrected pixel counter is used, the forward line corresponds to the counter value=3, 4, . . . , 17, 18, and 1, and the reverse line corresponds to the counter value=2, 3, . . . , 15, 16, 1, and 2. Thus, the drawing position of the forward line is shifted by two clock to the left, and the drawing position of the reverse line is shifted by two clock to the right. Therefore, the positions in the vertical direction of the counter values 6 to 15 in the forward line are the same as the positions in the vertical direction of the counter values 6 to 15 in the reverse line. As a result, the drawing area for the projected image 300 which is drawn by a repetition of the forward line and the reverse line corresponds to an ideal rectangular region as indicated by D15.

As described above, according to this embodiment, misalignment of an image in each scanning can be prevented. According to this embodiment, in the image display device of the laser scan system, the operation of the MEMS mirror is detected by the piezoelectric films formed on the optical scanner, and the drawing position is corrected based on the difference between the detected first and second operation ranges and the reference range. Thus, a deviation in the drawing position which is caused by a change in the detection waveform due to a variation in the operation of the MEMS mirror is corrected and the drawing area is constantly set at a certain location, thereby preventing drawing misalignment in each line. In particular, the counting start position is corrected according to difference between the reference range and the operation range, thereby eliminating the misalignment of the drawing position in each line and preventing drawing misalignment.

Note that the present invention is not limited to the above embodiments, and can be modified as appropriate without departing from the scope of the invention.

The present invention is applicable to an image display device and a control method thereof, particularly applicable to an image display device and control method for a laser scan system, so the present invention has an industrial applicability.

What is claimed is:

1. An image display device comprising:
    a light source unit configured to output a light beam;
    a scanning unit configured to reflect the light beam and repeat a reciprocating operation in a predetermined scanning direction;
    a scanning detection unit configured to detect a first operation range of the scanning unit in each forward or reverse scanning line of the reciprocating operation and a second operation range of the scanning unit in each reciprocation of the reciprocating operation;
    a display position determination unit configured to determine an image display position in each scanning line based on a first difference between the detected first operation range and a first reference value for the forward or reverse line and a second difference between the detected second operation range and a second reference value for the reciprocating operation; and
    a light source driving unit configured to drive the light source unit based on image data at a timing corresponding to the determined image display position.

2. The image display device according to claim 1, wherein the scanning unit repeats the reciprocating operation so that a forward operating range is equal to a reverse operating range.

3. The image display device according to claim 1, wherein the display position determination unit determines the image display position according to a difference between the first difference and the second difference.

4. The image display device according to claim 3, wherein the display position determination unit corrects the image display position by using half of the difference as a correct value.

5. The image display device according to claim 1, further comprising a counter configured to count the first operation range and the second operation range based on a clock,
    wherein the display position determination unit corrects a counting start position of the counter in each scanning line based on a difference between a count value obtained by counting the first operation range by the counter and a count value corresponding to the first reference value and a difference between a count value obtained by counting the second operation range by the counter and a count value corresponding to the second reference value.

6. The image display device according to claim 5, wherein the display position determination unit corrects the counting start position of the forward scanning line.

7. The image display device according to claim 1, wherein the scanning detection unit detects the first and second operation ranges based on a delayed signal that is generated by delaying a reciprocating operation detection signal according to the reciprocating operation of the scanning unit by a predetermined time.

8. A control method of an image display device, the image display device comprising: a light source unit configured to output a light beam; and a scanning unit configured to reflect the light beam and repeat a reciprocating operation in a predetermined scanning direction, the control method comprising:
    detecting a first operation range of the scanning unit in each forward or reverse scanning line of the reciprocating operation and a second operation range of the scanning unit in each reciprocation of the reciprocating operation;
    determining an image display position in each scanning line based on a first difference between the detected first operation range and a first reference value for the forward or reverse line and a second difference between the detected second operation range and a second reference value for the reciprocating operation; and
    driving the light source unit based on image data at a timing corresponding to the determined image display position.

* * * * *